US011058143B2

(12) United States Patent
Ademe

(10) Patent No.: US 11,058,143 B2
(45) Date of Patent: Jul. 13, 2021

(54) SMOKING-RELATED ARTICLE INSPECTION SYSTEMS AND ASSOCIATED METHODS

(71) Applicant: R. J. Reynolds Tobacco Company, Winston-Salem, NC (US)

(72) Inventor: Balager Ademe, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 239 days.

(21) Appl. No.: 15/788,075

(22) Filed: Oct. 19, 2017

(65) Prior Publication Data

US 2019/0116868 A1    Apr. 25, 2019

(51) Int. Cl.
*A24C 5/34* (2006.01)
*A24D 3/02* (2006.01)
*G06T 7/62* (2017.01)
*G06T 7/00* (2017.01)

(52) U.S. Cl.
CPC .......... *A24C 5/3412* (2013.01); *A24D 3/0295* (2013.01); *G06T 7/0006* (2013.01); *G06T 7/62* (2017.01); *G06T 2207/10116* (2013.01)

(58) Field of Classification Search
CPC ....... A24C 5/3412; G06T 7/0006; G06T 7/62; G06T 7/001; G06T 2207/10116; A24D 3/0295
See application file for complete search history.

(56) References Cited

U.S. PATENT DOCUMENTS

| | | | |
|---|---|---|---|
| 3,056,026 A | * | 9/1962 | Bigelow .............. A24C 5/3412 378/56 |
| 3,339,558 A | | 9/1967 | Waterbury |
| 3,390,686 A | | 7/1968 | Irby, Jr. et al. |
| 3,685,521 A | | 8/1972 | Dock |

(Continued)

FOREIGN PATENT DOCUMENTS

WO    WO 03/009711    2/2003

OTHER PUBLICATIONS

Radzuan, et al., "Medium Chain Triglycerides: A Brief Review," Porim Bulletin, 1999, vol. 38, pp. 33-38.

*Primary Examiner* — Aaron W Carter
(74) *Attorney, Agent, or Firm* — Womble Bond Dickinson (US) LLP

(57) ABSTRACT

Smoking-related article inspection systems and associated methods are disclosed herein. In some aspects, the systems include an x-ray imaging device configured to capture at least one image of the smoking-related articles, a smoking-related article transporting device configured to sequentially introduce the smoking-related articles into the imaging zone; and an analysis unit in communication with the x-ray imaging device and configured to analyze the at least one image captured by the x-ray imaging device for each of the smoking-related articles, the analysis unit being configured to execute: an inspection tool to determine values for one or more parameters of each of the smoking-related articles based on the analysis of the at least one image; and a comparison tool to determine an acceptability of the smoking-related articles for further processing based on comparing the determined values for the one or more parameters to ideal values for the one or more parameters.

33 Claims, 11 Drawing Sheets

(56) References Cited

U.S. PATENT DOCUMENTS

| | | | |
|---|---|---|---|
| 3,916,914 A | 11/1975 | Brooks et al. | |
| 4,785,830 A * | 11/1988 | Moller | A24C 5/1871 |
| | | | 131/108 |
| 4,889,144 A | 12/1989 | Tateno et al. | |
| 5,223,185 A | 6/1993 | Takei et al. | |
| 5,232,079 A * | 8/1993 | Belcastro | A24C 5/34 |
| | | | 198/370.11 |
| 5,244,075 A * | 9/1993 | Obara | B65B 19/30 |
| | | | 131/282 |
| 5,329,945 A * | 7/1994 | Irikura | A24C 5/345 |
| | | | 131/280 |
| 5,387,093 A | 2/1995 | Takei | |
| 5,882,680 A | 3/1999 | Suzuki et al. | |
| 6,631,722 B2 | 10/2003 | MacAdam et al. | |
| 6,719,933 B2 | 4/2004 | Nakamura et al. | |
| 6,949,256 B2 | 9/2005 | Fonkwe et al. | |
| 7,479,098 B2 | 1/2009 | Thomas et al. | |
| 7,754,239 B2 | 7/2010 | Mane et al. | |
| 7,793,665 B2 | 9/2010 | Dube et al. | |
| 7,836,895 B2 | 11/2010 | Dube et al. | |
| 8,308,623 B2 | 11/2012 | Nelson et al. | |
| 8,470,215 B2 | 6/2013 | Zhang | |
| 8,695,609 B2 | 4/2014 | Dube et al. | |
| 8,905,243 B2 | 12/2014 | Dixon et al. | |
| 9,398,777 B2 * | 7/2016 | Thomas | A24D 3/0216 |
| 9,664,570 B2 | 5/2017 | Ademe et al. | |
| 9,844,232 B2 * | 12/2017 | Wood | A24C 5/3412 |
| 10,013,615 B2 * | 7/2018 | Zhang | G06K 9/38 |
| 10,134,147 B2 * | 11/2018 | Gadi | G06K 9/00 |
| 10,297,020 B2 * | 5/2019 | Keulers | H04N 13/239 |
| 2004/0129531 A1 * | 7/2004 | Nagai | A24C 5/327 |
| | | | 198/370.12 |
| 2004/0173226 A1 * | 9/2004 | Hanaoka | A24C 5/3412 |
| | | | 131/280 |
| 2004/0224020 A1 | 11/2004 | Schoenhard | |
| 2005/0196437 A1 | 9/2005 | Bednarz et al. | |
| 2005/0249676 A1 | 11/2005 | Scott et al. | |
| 2007/0227548 A1 * | 10/2007 | Crooks | A24D 3/043 |
| | | | 131/341 |
| 2009/0194118 A1 * | 8/2009 | Ademe | A24C 5/3412 |
| | | | 131/346 |
| 2010/0059074 A1 * | 3/2010 | Brantley | A24C 5/3412 |
| | | | 131/280 |
| 2010/0303287 A1 * | 12/2010 | Morton | G01N 23/046 |
| | | | 382/100 |
| 2011/0169942 A1 * | 7/2011 | Brantley | A24C 5/3412 |
| | | | 348/92 |
| 2011/0271968 A1 | 11/2011 | Carpenter et al. | |
| 2012/0120229 A1 * | 5/2012 | Brantley | B65B 19/28 |
| | | | 348/92 |
| 2014/0261486 A1 | 9/2014 | Potter et al. | |
| 2015/0257437 A1 * | 9/2015 | Wood | G06T 7/001 |
| | | | 348/125 |
| 2015/0264319 A1 * | 9/2015 | Wood | H04N 7/181 |
| | | | 348/125 |
| 2015/0348256 A1 * | 12/2015 | Lee | A24C 5/3412 |
| | | | 382/143 |
| 2017/0059391 A1 * | 3/2017 | Ademe | B07C 5/342 |
| 2017/0208856 A1 | 7/2017 | Ademe | A24C 5/343 |
| 2017/0242148 A1 * | 8/2017 | Yu | G01F 17/00 |
| 2019/0116868 A1 * | 4/2019 | Ademe | A24D 3/0295 |
| 2020/0037658 A1 * | 2/2020 | Ademe | A24C 5/345 |
| 2020/0200690 A1 * | 6/2020 | Morton | G01N 23/046 |

\* cited by examiner

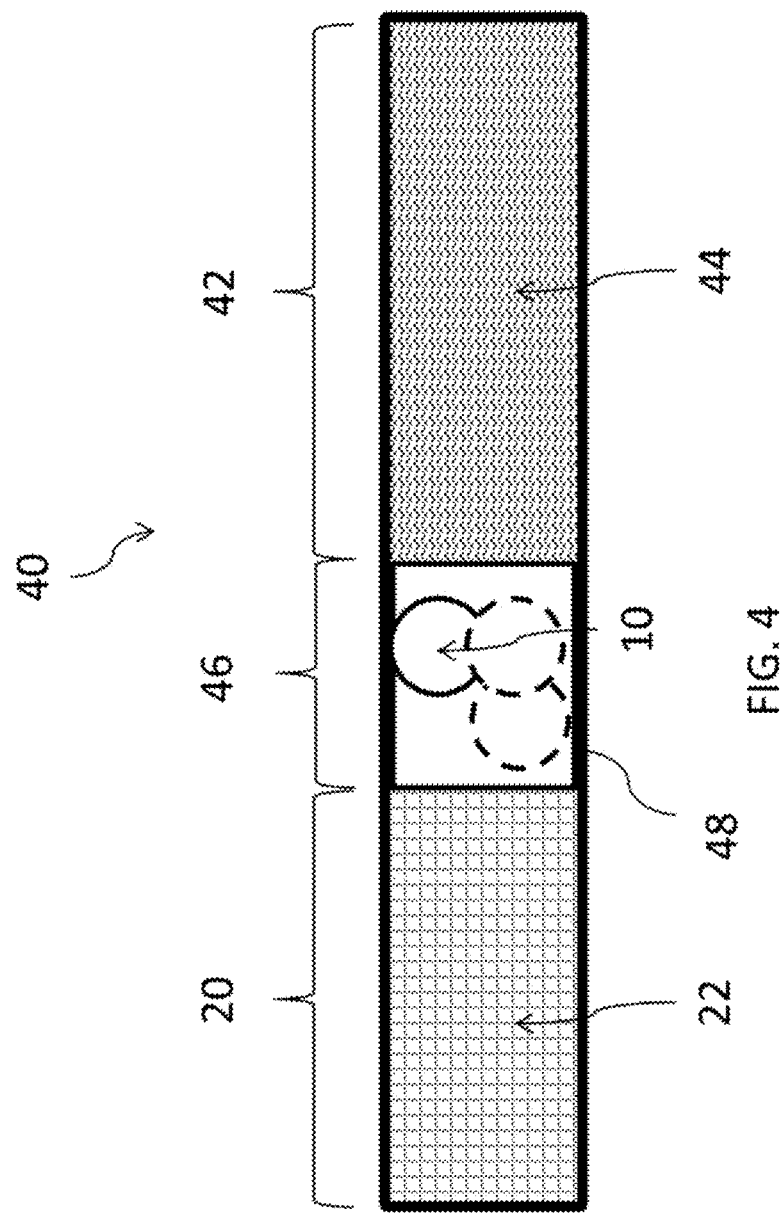

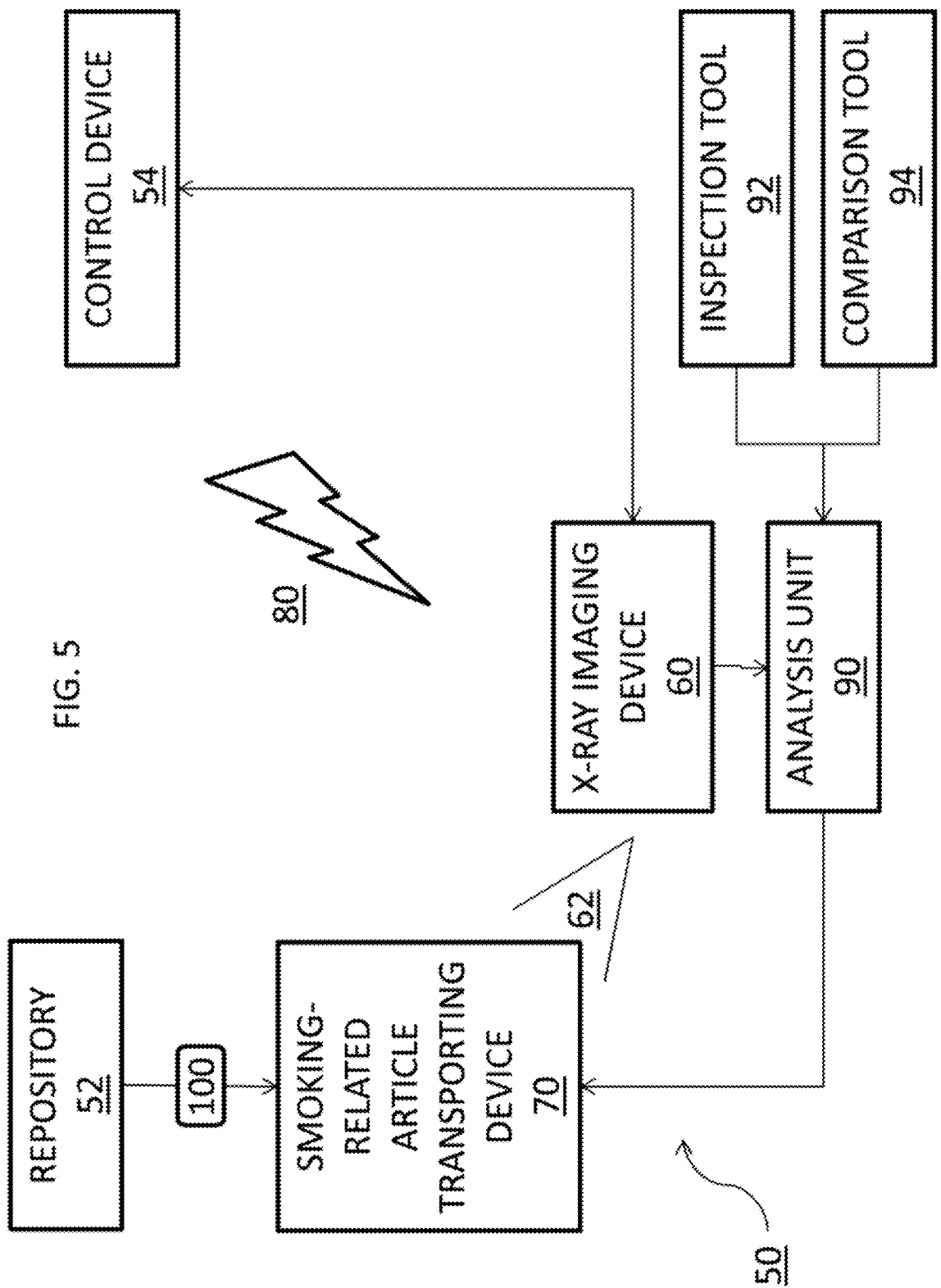

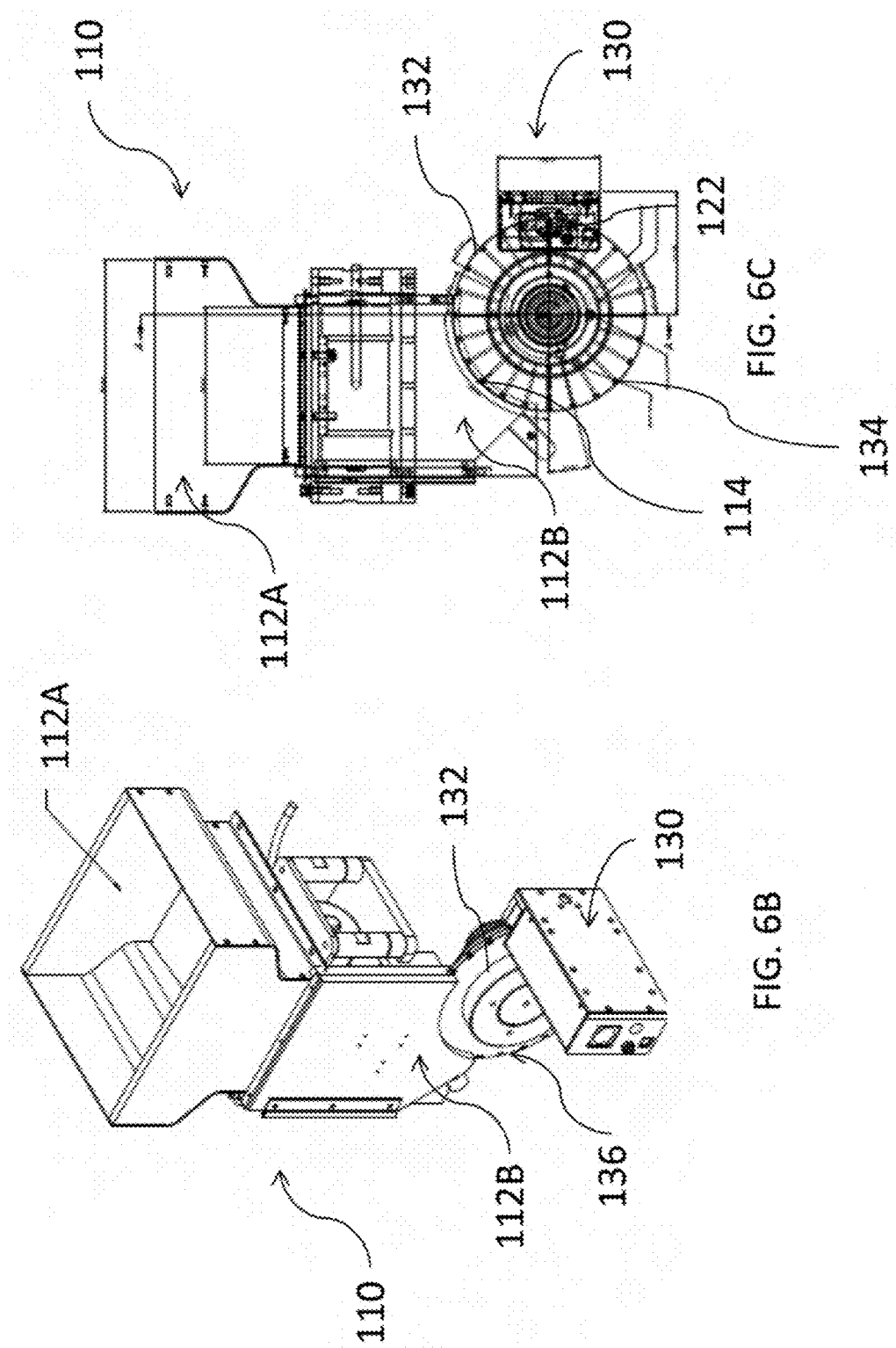

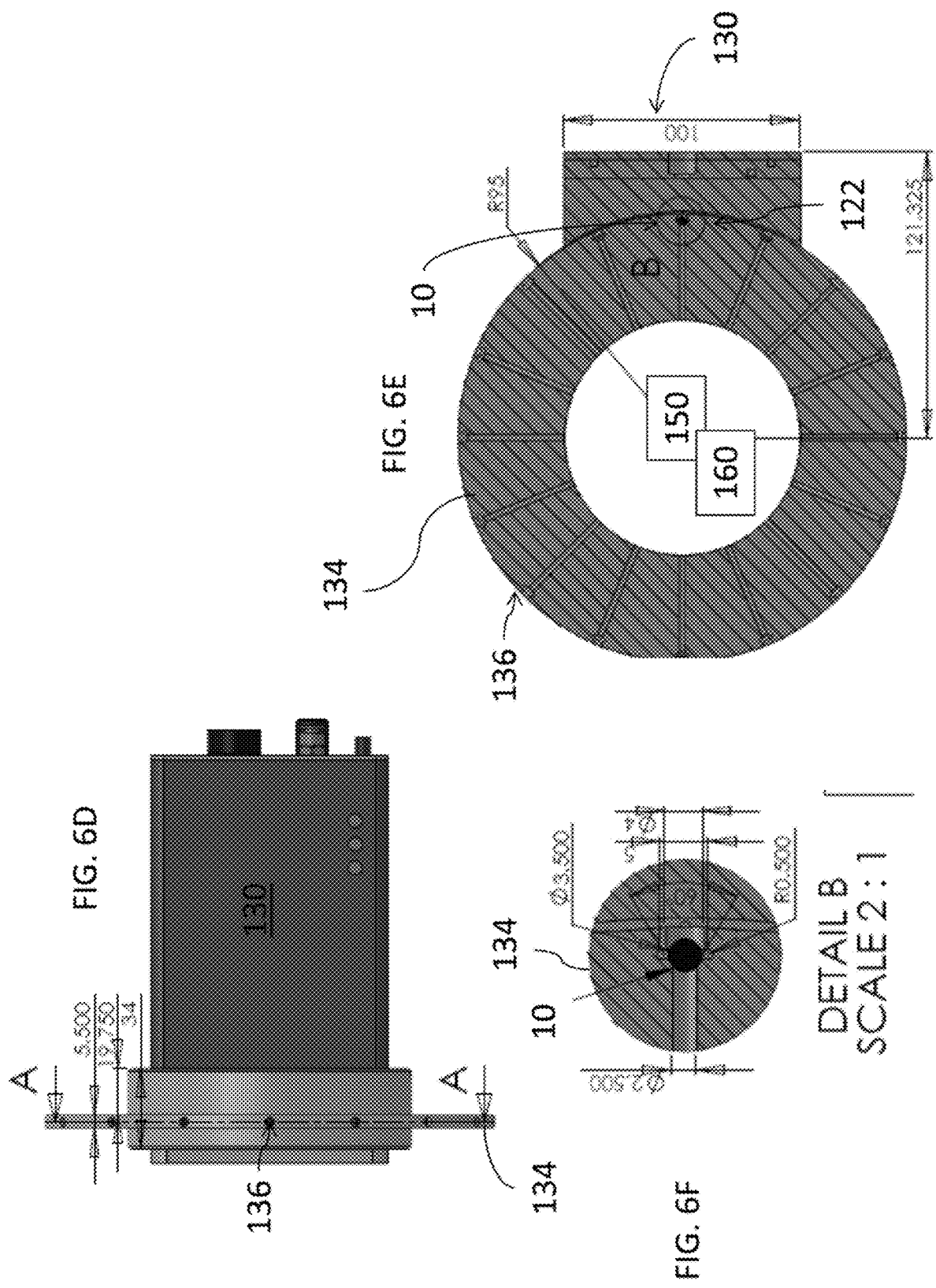

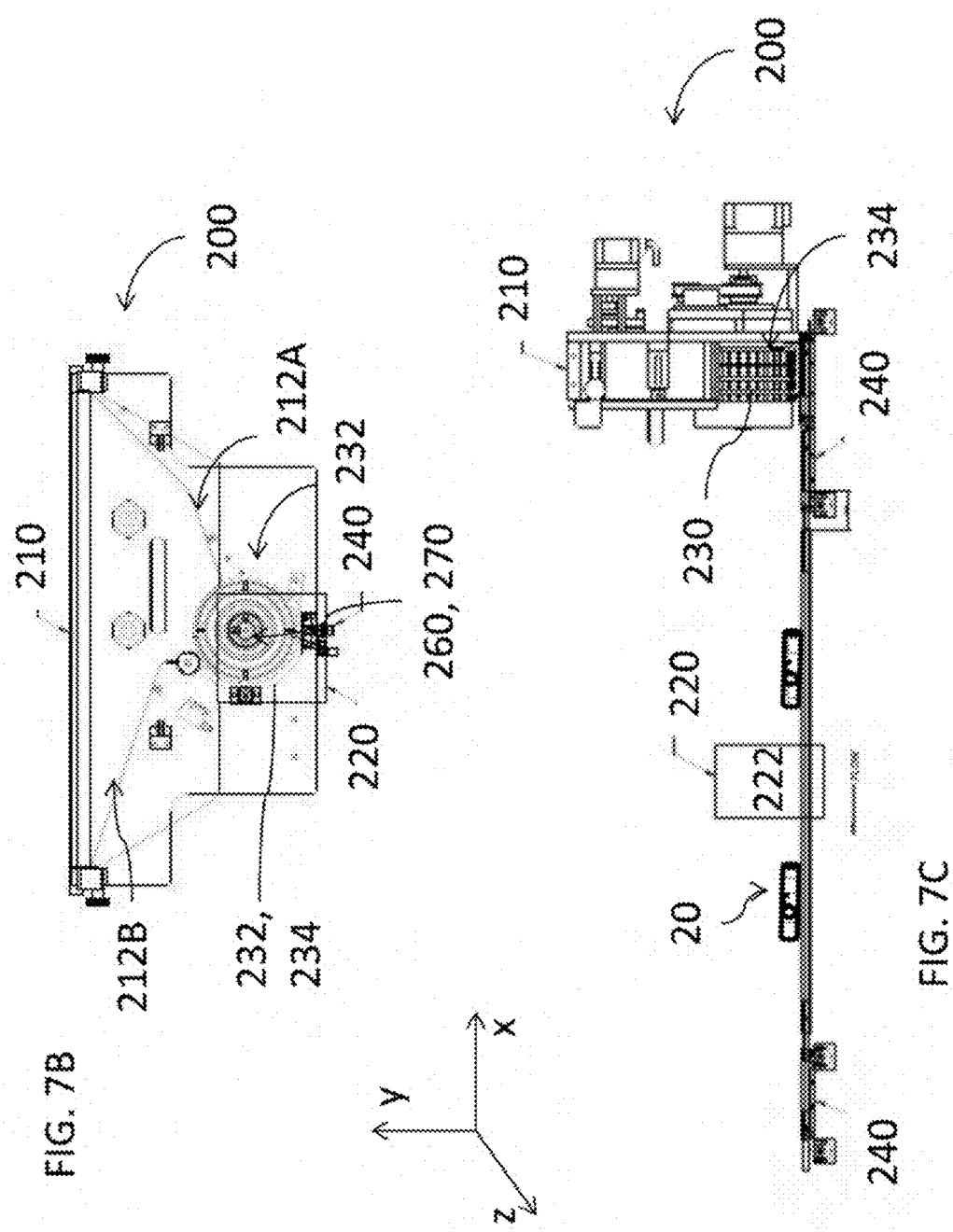

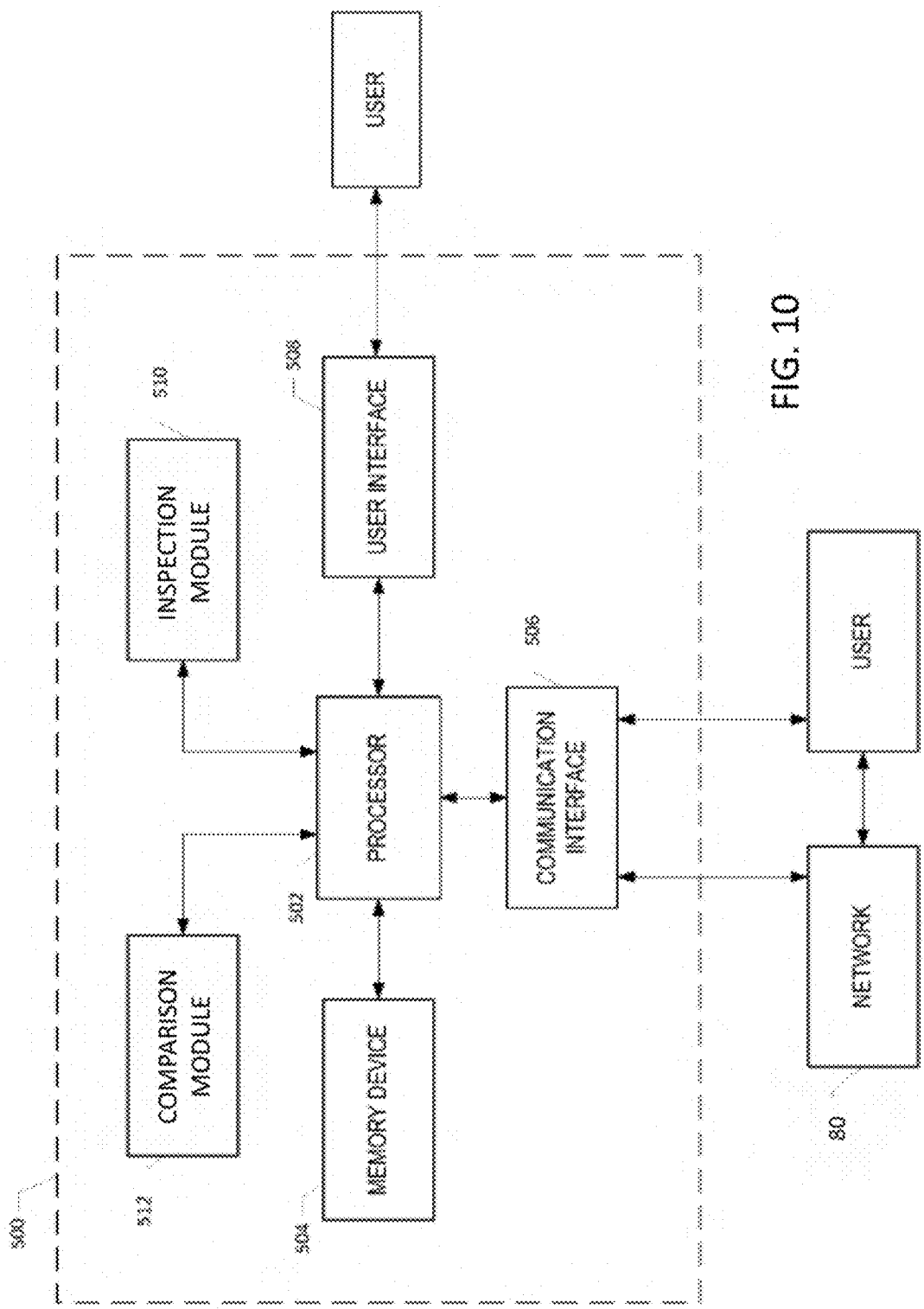

SMOKING-RELATED ARTICLE INSPECTION SYSTEMS AND ASSOCIATED METHODS

BACKGROUND

Field of the Disclosure

The present disclosure relates to smoking-related articles and more particularly to smoking-related article inspection systems and related methods. The smoking-related articles may be made or derived from tobacco, or otherwise incorporate tobacco, and may be intended for human consumption.

Description of Related Art

Popular smoking articles, such as cigarettes, smokeless tobacco products, and/or the like typically include a smoking-related article. During the production of these smoking articles, inspection of the smoking-related articles (e.g., tobacco or tobacco-related material, a capsule provided within the tobacco or tobacco-related material, a filter material having the one or more capsule incorporated therein, or the smoking articles themselves) is desirable. One example of a system for analyzing a smoking article is set forth in U.S. Pat. No. 9,664,570 to Ademe et al., which is incorporated herein by reference in its entirety. For example, inspection of the smoking-related articles to be included in the smoking article occurs before, during, and/or after the production of the smoking article. Inspection of the smoking-related articles during and/or after the production of a smoking article which includes the smoking-related article provides additional difficulties. For example, a system configured to inspect smoking-related articles (e.g., capsules) after the smoking article has been produced could allow for the introduction of a defective smoking-related article in the final smoking article, thereby wasting materials by producing a defective smoking article. In this regard, the manufactured smoking article that includes the defective smoking-related article cannot be sold for consumption because the perception of the quality of the smoking article may be damaged.

As such, it may be desirable to inspect some smoking-related articles such as capsules to determine which smoking-related articles are defective before incorporating any smoking-related articles into a smoking article. In particular, it may be desirable to determine if a capsule, which includes an outer shell and a payload, has a volume of the payload that is substantially equal to or within predetermined acceptable limits. Further, it may be desirable to perform the inspection of smoking-related articles largely, or entirely, by high-speed automated machinery. As such, there exists a need for a system and method for inspecting smoking-related articles for defects prior to those smoking-related articles being included within a smoking article for distribution and sale. Furthermore, it may be desirable to inspect a finished smoking article itself prior to packaging so as to determine the integrity of particular smoking-related articles associated therewith. It is also desirable for these solutions to be readily implemented with respect to existing smoking article production machinery.

SUMMARY OF THE DISCLOSURE

The above and other needs are met by aspects of the present disclosure which, in one aspect, provides an x-ray imaging device configured to capture at least one image of the smoking-related articles sequentially introduced into an imaging zone, the imaging zone being defined by a field of view of the x-ray imaging device; a smoking-related article transporting device configured to sequentially introduce the smoking-related articles into the imaging zone; and an analysis unit in communication with the x-ray imaging device and configured to analyze the at least one image captured by the x-ray imaging device for each of the smoking-related articles, the analysis unit being configured to execute: an inspection tool configured to determine values for one or more parameters of each of the smoking-related articles based on the analysis of the at least one image; and a comparison tool configured to determine an acceptability of the smoking-related articles for further processing based on comparing the determined values for the one or more parameters to ideal values for the one or more parameters, wherein the smoking-related articles acceptable for further processing have determined values of the one or more parameters at least equivalent to the ideal values for the one or more parameters and the smoking-related articles not acceptable for further processing have determined values of the one or more parameters less than the ideal values for the one or more parameters.

In another aspect, the present disclosure provides a method for inspecting smoking-related articles, the method comprising: sequentially introducing individual smoking-related articles into an imaging zone, the imaging zone being defined by a field of view of an x-ray imaging device; capturing, by the x-ray imaging device, at least one image of each smoking-related article sequentially introduced into the imaging zone; and analyzing, by an analysis unit in communication with the x-ray imaging device, the at least one image for each of the smoking-related articles, the analysis including: executing an inspection tool to determine values for one or more parameters of each of the smoking-related articles based on the at least one image; and executing a comparison tool to determine an acceptability of the smoking-related articles for further processing based on comparing the determined values for the one or more parameters to ideal values for the one or more parameters, where the smoking-related articles acceptable for further processing are those having determined values of the one or more parameters at least equivalent to the ideal values for the one or more parameters and the smoking-related articles not acceptable for further processing are those having determined values of the one or more parameters that are less than the ideal values for the one or more parameters.

In a still further aspect, a computer-readable storage medium that is non-transitory and has computer-readable program code portions stored therein that, in response to execution by a processor, cause a system to at least: sequentially introduce individual smoking-related articles into an imaging zone, the imaging zone being defined by a field of view of an x-ray imaging device; capture, by the x-ray imaging device, at least one image of each smoking-related article sequentially introduced into the imaging zone; and analyze, by an analysis unit in communication with the x-ray imaging device, the at least one image for each of the smoking-related articles, the analysis including: executing an inspection tool to determine values for one or more parameters of each of the smoking-related articles based on the at least one image; and executing a comparison tool to determine an acceptability of the smoking-related articles for further processing based on comparing the determined values for the one or more parameters to ideal values for the one or more parameters, where the smoking-related articles acceptable for further processing are those having determined values of the one or more parameters at least equivalent to the ideal values for the one or more parameters and the smoking-related articles not acceptable for further processing are those having determined values of the one or more parameters that are less than the ideal values for the one or more parameters.

These and other features, aspects, and advantages of the disclosure will be apparent from a reading of the following detailed description together with the accompanying drawings, which are briefly described below.

BRIEF DESCRIPTION OF THE DRAWINGS

In order to assist the understanding of aspects of the disclosure, reference will now be made to the appended drawings, which are not necessarily drawn to scale and in which like reference numerals refer to like elements. The drawings are exemplary only, and should not be construed as limiting the disclosure.

FIG. 4 illustrates a cross-sectional view of a smoking article including a filter rod coaxially aligned with and axially spaced apart from an axially extending fuel source so as to define a compartment therebetween, the compartment having one or more of the capsule objects of FIG. 1 disposed therein according to one example aspect of the present disclosure;

FIG. 5 illustrates a schematic diagram of an inspection system configured to inspect smoking-related articles according to an example aspect of the present disclosure;

FIGS. 6A-6C illustrate a front perspective view, a rear perspective view, and a front view, respectively, of an inspection system configured to inspect the capsule object of FIG. 1 according to one example aspect of the present disclosure;

FIGS. 6D-6F illustrate detailed views of an x-ray imaging device and a feed wheel of the inspection system configured to inspect the capsule objects of FIGS. 6A-6C according to one example aspect of the present disclosure;

FIGS. 7A-7C illustrate a front perspective view, a front view, and a side view, respectively, of an inspection system configured to inspect the filter rod of FIG. 2 or the smoking article including the portion of the filter rod of FIG. 3 according to one example aspect of the present disclosure;

FIG. 10 illustrates a schematic view of components of an analysis unit of the inspection system of FIG. 5 according to one example aspect of the present disclosure.

DETAILED DESCRIPTION OF THE ASPECTS OF THE DISCLOSURE

The present disclosure will now be described more fully hereinafter with reference to exemplary aspects thereof. These exemplary aspects are described so that this disclosure will be thorough and complete, and will fully convey the scope of the disclosure to those skilled in the art. Indeed, the disclosure may be expressed in many different forms and should not be construed as limited to the aspects set forth herein; rather, these aspects are provided so that this disclosure will satisfy applicable legal requirements. As used in the specification, and in the appended claims, the singular forms "a", "an", "the", include plural referents unless the context clearly dictates otherwise.

"Smoking-related articles" as used in the present disclosure refer generally to a capsule object including an outer shell and a payload disposed within the outer shell, a filter rod including a filter material having one or more of the capsule objects disposed therein, a smoking article including a portion of the filter material having the one or more of the capsule objects introduced therein, and/or a smoking article including a filter rod coaxially aligned with and axially spaced apart from an axially extending fuel source so as to define a compartment therebetween, the compartment being circumscribed by a foil wrapper and having one or more of the capsule objects disposed therein. "Smoking-related articles" as used in the present disclosure may also generally refer to various tobacco or tobacco-related material, such as granules, pellets, beads, discrete small units, carbon pieces, extruded carbon pieces, ceramic beads, marumarized tobacco pieces, extruded or compressed cylindrical or spherical elements, milled tobacco lamina, fillers, flavors, visible aerosol forming materials, binders, ovoid elements, irregularly shaped elements, shredded tobacco pieces or flakes, elements including tobacco, elements including a visible aerosol-forming material, adsorbent objects, absorbent objects, capsules, microcapsules, a honeycomb monolith, a single porous structure, and combinations thereof.

Figure 1:
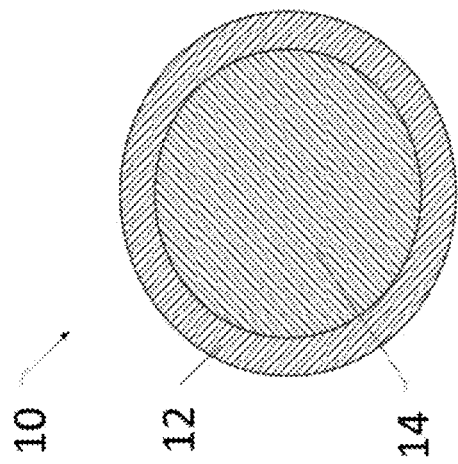
FIG. 1 illustrates a cross-sectional view of a capsule object according to an example aspect of the present disclosure.

One exemplary smoking-related article is illustrated in FIG. 1. More particularly, a cross-section of a capsule object 10 of the type referred to as a smoking-related article herein is illustrated. The capsule object 10 includes an outer shell 12 incorporating an outer shell material, and a payload 14 incorporating an aqueous or non-aqueous liquid (e.g., a solution or dispersion of at least one flavoring ingredient within water or an organic liquid such as an alcohol or oil, or a mixture of water and a miscible liquid like alcohol or glycerin).

Representative types of capsules are of the type commercially available as "Momints" by Yosha! Enterprises, Inc. and "Ice Breakers Liquid Ice" from The Hershey Company. Representative types of capsules also have been incorporated in chewing gum, such as the type of gum marketed under the tradename "Cinnaburst" by Cadbury Adams USA. Representative types of capsules and components thereof also are set forth in U.S. Pat. No. 3,339,558 to Waterbury; U.S. Pat. No. 3,390,686 to Irby, Jr. et al.; U.S. Pat. No. 3,685,521 to Dock; U.S. Pat. No. 3,916,914 to Brooks et al.; U.S. Pat. No. 4,889,144 to Tateno et al. and U.S. Pat. No. 6,631,722 to MacAdam et al.; and PCT Application WO 03/009711 to Kim; which are incorporated herein by reference in their entireties. See also, the types of capsules and components thereof set forth in U.S. Pat. No. 5,223,185 to Takei et al.; U.S. Pat. No. 5,387,093 to Takei; U.S. Pat. No. 5,882,680 to Suzuki et al.; U.S. Pat. No. 6,719,933 to Nakamura et al.; U.S. Pat. No. 7,754,239 to Mane et al. and U.S. Pat. No. 6,949,256 to Fonkwe et al.; and U.S. Pat. App. Pub. Nos. 2004/0224020 to Schoenhard; 2005/0196437 to Bednarz et al. and 2005/0249676 to Scott et al.; which are incorporated herein by reference in their entireties. See also, the types of representative smoking related articles disclosed in US 2014/0261486 to Potter et al.

In some aspects, capsule objects 10 are incorporated within other smoking-related articles and/or smoking articles such as, for example, filter elements, rods of tobacco, and/or within smokeless tobacco products such as a snuff or snus product. In some aspects, the payload 14 of the capsule object 10 includes a flavoring agent configured to flavor the tobacco product. Examples of tobacco products including capsules are described in U.S. Pat. App. Pub. No. 2011/0271968 to Carpenter et al., U.S. Pat. No. 8,695,609 to Dube et al., U.S. Pat. No. 8,308,623 to Nelson et al., and U.S. Pat. No. 7,793,665 to Dube et al., each of which are incorporated herein by reference in their entireties.

Exemplary flavoring agents that are able to be encapsulated within the capsule object 10 are natural or synthetic, and the character of these flavors is described, without limitation, as fresh, sweet, herbal, confectionary, floral, fruity or spice. Specific types of flavors include, but are not limited to, vanilla, coffee, chocolate, cream, mint, spearmint, menthol, peppermint, wintergreen, lavender, cardamom, nutmeg, cinnamon, clove, cascarilla, sandalwood, honey, jasmine, ginger, anise, sage, licorice, lemon, orange, apple, peach, lime, cherry, and strawberry. See also, Leffingwill et al., Tobacco Flavoring for Smoking Products, R. J. Reynolds Tobacco Company (1972). Flavorings also include components that are considered, for example, moistening, cooling or smoothening agents, such as eucalyptus. These flavors are provided neat (i.e., alone) or in a composite (e.g., spearmint and menthol, or orange and cinnamon). Composite flavors are combined in a single capsule object 10 as a mixture, or as components of multiple capsule objects 10. Preferably, the capsule objects 10 do not incorporate any tobacco within their outer shells 12, or within their payload 14 regions. However, if desired, other embodiments of capsule objects incorporate tobacco (e.g., as finely grouped tobacco pieces and/or tobacco extracts) within their outer shells and/or within their payload regions. See, for example, U.S. Pat. No. 7,836,895 to Dube et al., which is incorporated herein by reference in its entirety.

In some aspects, the payload 14 is a mixture of a flavoring agent and a diluting agent or carrier. A preferred diluting agent is a triglyceride, such as a medium chain triglyceride, and more particularly a food grade mixture of medium chain triglycerides. See, for example, Radzuan et al., Porim Bulletin, 39, 33-38 (1999). The amount of flavoring and diluting agent within the capsule object 10 is variable. In some instances, the diluting agent is able to be eliminated altogether, and the entire payload 14 is comprised of the flavoring agent entirely. Alternatively, the payload 14 is almost entirely comprised of diluting agent, and only contains a very small amount of relatively potent flavoring agent. In one embodiment, the composition of the mixture of flavoring and diluting agent is in the range of about 5 percent to about 75 percent flavoring, and more preferably in the range of about 5 percent to about 25 percent flavoring, and most preferably in the range of about 10 percent to about 15 percent, by weight based on the total weight of the payload 14, with the balance being diluting agent. Preferred components of the payload 14 provide a desired alteration to the sensory attributes of the tobacco product such as, for example, smell, flavor, and/or mouthfeel.

The size and weight of each capsule object 10 is variable depending upon the desired properties it is to impart to the smoking article. Preferred capsule objects 10 are generally spherical in shape. However, suitable capsule objects have other types of shapes, such as generally rectilinear, oblong, elliptical, or oval shapes. Exemplary smaller spherical capsule objects have diameters of at least about 0.5 mm, generally at least about 1 mm, often at least about 2 mm, and frequently at least about 3 mm. Exemplary larger spherical capsule objects have diameters of less than about 6 mm, and often less than about 5 mm. Exemplary smaller individual capsule objects weigh at least about 5 mg, often at least about 10 mg, and frequently at least about 15 mg. Exemplary larger individual capsule objects weigh less than about 75 mg, generally less than about 65 mg, and often less than about 55 mg. In a preferred embodiment, the capsule objects define a weight between about 20 grams and about 30 grams and a maximum dimension between about 3 mm and about 4 mm.

In some aspects, a volume of the payload 14 is variable depending upon the desired properties it is to impart to the smoking article. Preferred capsule objects 10 comprise an ideal volume of payload 14. In some aspects, the ideal volume of the payload 14 is dependent upon the size and/or shape of the capsule object 10. For example, an ideal volume of payload for larger spherical capsule objects is larger than an ideal volume of payload for smaller spherical capsule objects. In other aspects, the ideal volume of the payload 14 is dependent on the desired property that the payload 14 and/or the capsule object 10 is to impart to the smoking article. Further information regarding dimensioning of capsule objects 10 is provided for example in US Patent Application Pub. No. 2017/0059391 to Ademe, which is incorporated herein by reference in its entirety.

The crush strength of the capsule object 10 is sufficient to allow for normal handling and storage without a significant degree of premature or undesirable breakage. In particular, the crush strength of the outer shell 12 of the capsule object 10 is sufficient to allow for normal handling and storage without a significant degree of premature and/or undesirable breakage. The crush strength of the capsule object 10 also is sufficiently low so as to allow the smoking article user to readily break a capsule object 10 in a purposeful manner when using the particular smoking article that employs the capsule object 10. Providing the capsule object 10 that possess both suitable integrity and ability to rupture is able to be determined by experimentation, depending upon factors such as capsule size and type. See, for example, U.S. Pat. No. 7,479,098 to Thomas et al., which is incorporated herein by reference in its entirety.

That is, the outer shell 12 of the capsule objects 10 is configured to be ruptured at the discretion of the smoker to release the payload 14. Highly preferred capsules are capable of releasing the payload 14 at the command of the user. For example, a preferred capsule object 10 containing the payload 14 is resistant to the release of the payload 14 until the time that the smoker applies a purposeful application of physical force (e.g., crush strength) sufficient to rupture the hollow capsule.

During the manufacture of a smoking article that includes a capsule object 10, it is desirable in some aspects to inspect the smoking article including the capsule object 10 at least before the packaging and transport of said smoking article. It is desirable, however, to inspect the capsule object 10 at additional or alternative stages during the manufacture of the smoking article. For example, it is desirable to inspect the capsule object 10 prior to incorporating the capsule object 10 into the smoking-related article (e.g., a filter material) and/or the smoking article (e.g., a cigarette). In particular, it is known that during manufacture of the capsule objects 10, some of the capsule objects 10 produced may not comprise a desired integrity or may otherwise become damaged during post-manufacture handling. In such instances, for example, capsule objects 10 lack integrity because the outer shells 12 have ruptured and released the payload 14, have less than an ideal volume of inner payload, and the like. As such, it is desirable to separate capsule objects 10 lacking integrity from those that have integrity before further manufacturing stages. Additionally or alternatively, it is desirable to inspect the capsule object 10 upon completion of manufacturing the capsule object 10.

Figure 2:
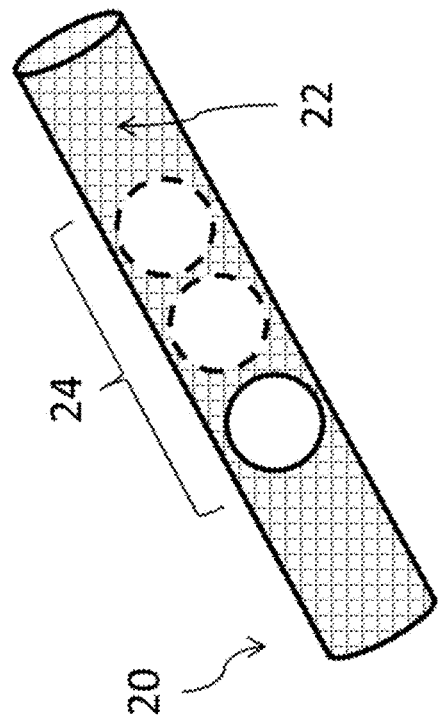
FIG. 2 illustrates a cross-sectional view of a filter rod including a filter material having one or more of the capsule objects of FIG. 1 disposed therein according to one example aspect of the present disclosure.

FIG. 2 illustrates another exemplary smoking-related article. More particularly, FIG. 2 illustrates a filter rod 20 including a filter material 22 having one or more of the capsule objects 10 disposed therein. The filter rod 20 comprises in some aspects a filter material 22 of a cellulose acetate tow impregnated with triacetin plasticizer. Within the filter material 22 of the filter rod 20, one or more of the capsule objects 10 are securely disposed, positioned, or otherwise introduced. In some aspects, a tongue or other type of mechanism (not shown) is used to separate the filter material 22 of the filter rod 20 and dispose the one or more capsule objects 10 along a longitudinal axis of the filter rod 20. Preferably, the one or more capsule objects 10 are disposed within the filter material 22 particularly towards a central region 24 of the filter rod 20 along the longitudinal axis thereof.

The number of capsule objects 10 disposed along the longitudinal axis of the filter rod 20 is most preferably a pre-determined number, and that number is one, two, three, or more. As described above, each of the one or more capsule objects 10 carry a payload 14 incorporating a compound that is intended to introduce some change to the nature or character of mainstream smoke drawn through that filter material 22 of the filter rod 20 (e.g., a flavoring agent) upon purposeful application of physical force (e.g., crush strength) sufficient to rupture the capsule object 10. Typically, the filter material 22 of the filter rod 20, such as a cellulose acetate tow, is generally absorbent of liquid materials of the type that comprise the payload 14, and hence the released payload components are capable of undergoing wicking (or otherwise experiencing movement or transfer) throughout the filter material 22 of the filter rod 20.

However, it is known that during transport and/or incorporation of the capsule objects 10 into the filter material 22 of the filter rod 20, the outer shells 12 of the one or more capsule objects 10 are capable of rupturing and releasing the payload 14 onto the fibrous tow of the filter material 22. Although the one or more capsule objects 10 are configured to do so at the discretion of the smoker during use of a smoking article, it is not desirable for release of the payload 14 to occur prematurely (i.e., during manufacture of the filter rod 20). Where premature rupture and release has occurred, the filter material of the filter rod 20 lacks integrity. As such, it is desirable to separate the filter rods 20 having one or more capsule object 10 disposed therein that has ruptured from the filter rods 20 incorporating one or more capsule object 10 that has not ruptured before further manufacturing stages. Thus, a filter rod 20 incorporating one or more capsule objects 10 that has ruptured and released its payload 14 is removed from the smoking article manufacturing process.

Figure 3:
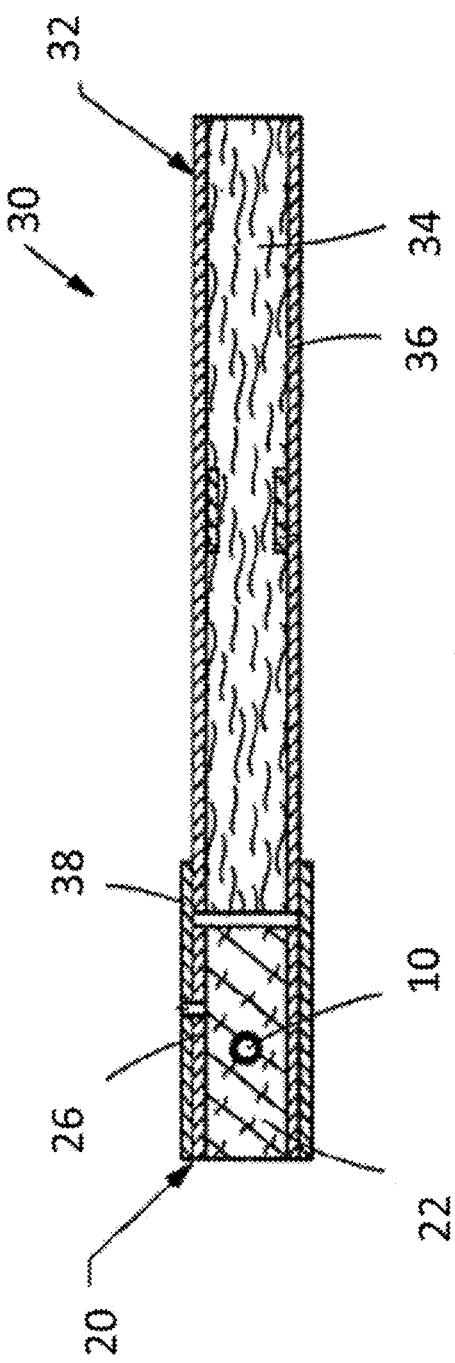
FIG. 3 illustrates a cross-sectional view of a smoking article including a portion of the filter rod of FIG. 2 having the one or more of the capsule objects disposed therein, the portion of the filter rod being coaxially aligned and serially engaged with an axially extending fuel source according to one example aspect of the present disclosure.

FIG. 3 illustrates another exemplary smoking-related article. More particularly, FIG. 3 illustrates a smoking article 30, such as a cigarette, possessing certain representative components of a smoking article. The smoking article 30 includes in some aspects, a fuel source 32. As illustrated in FIG. 3, for example, the fuel source 32 is formed as a cylindrical rod of a charge or roll of smokeable filler material 34 contained in a circumscribing wrapping material 36. The ends of the fuel source 32 are open to expose the smokeable filler material 34 (e.g., tobacco).

At one end of the fuel source 32 is a lighting end, and at the other end is positioned a portion of a filter rod 20 including filter material 22 having one or more capsule objects 10 disposed therein. The portion of the filter rod 20 is, in some aspects, a portion of the filter rod 20 described in reference to FIG. 2, divided into individual portions suitable for use in smoking articles, such as that illustrated in FIG. 3. As illustrated in FIG. 3, the portion of the filter rod 20 includes one or more of the capsule objects 10 disposed therein.

In some aspects, the portion of the filter rod 20 positioned adjacent one end of the smoking article 30 is disposed such that the portion of the filter rod 20 is coaxially aligned and serially engaged with the axially extending fuel source 32. In this manner, the portion of the filter rod 20 and the fuel source 32 are in a longitudinal end-to-end relationship, preferably abutting one another. The portion of the filter rod 20 is, in some aspects, a discrete portion of a filter rod having a generally cylindrical shape, the diameter thereof being essentially equal to the diameter of the fuel source 32 formed as a tobacco rod 32.

The filter material 22 (e.g., cellulose acetate tow impregnated with triacetin plasticizer) is, in some aspects overwrapped along the longitudinally extending surface thereof with circumscribing plug wrap material 26. That is, the portion of the filter rod 20 is circumscribed along its outer circumference or longitudinal periphery by a layer of plug wrap 26, and each end is open to expose the filter material 22. In some further aspects, the portion of the filter rod 20 is attached to the fuel source 32 using tipping material 38 (e.g., essentially air impermeable tipping paper), that circumscribes both the entire length of the portion of the filter rod 20 and an adjacent region of the fuel source 32. Further information regarding smoking articles having capsule objects disposed in the filter material is provided, for example, in U.S. Pat. No. 8,470,215 to Zhang, incorporated herein in its entirety by reference.

Within the filter material 22 of the portion of the filter rod 20 is disposed one or more of the capsule objects 10. The one or more capsule objects 10 are the same as or similar to the capsule objects 10 described in reference to FIG. 1. The number of capsule objects within each portion of the filter rod 20, most preferably is a pre-determined number, and that number is one, two, three, or more. In some aspects, each portion of the filter rod 20 contains a single capsule object 10. Preferably, the capsule object 10 is disposed within the filter material 22 of the portion of the filter rod 20, particularly towards the central region 24 thereof. Most preferably, the nature of the filter material 22 is such that the one or more capsule objects 10 is secured or lodged in place within the filter material 22. As noted in reference to FIGS. 1 and 2, each of the one or more capsule objects 10 is configured to carry a payload 14 incorporating a compound that is intended to introduce some change to the nature or character of mainstream smoke drawn through the portion of the filter rod 20 (e.g., a flavoring agent). That is, the outer shells 12 of the capsules 10 are rupturable at the discretion of the smoker to release the payload 14 within and into the filter material 22. Highly preferred capsules are capable of releasing the agent at the command of the user. Typically, the filter material 22, such as cellulose acetate tow, is generally absorbent of liquid materials of the type that comprise the payload 14, and hence the released payload components are capable of undergoing wicking (or otherwise experiencing movement or transfer) throughout the portion of the filter rod 20.

However, it is known that during transportation and/or manipulation of the filter rods, e.g., during division of the filter rods into portions thereof, during wrapping of the portion of the filter rods 20 with the fuel sources 32 to form the smoking articles 30, etc., the capsule objects 10 disposed within the filter material 22 of the filter rod 20 are capable of rupturing and releasing the inner payload 14 onto the fibrous tow/filter material 22 of the filter rod 20. Although the one or more capsule objects 10 are configured to do so at the discretion of the smoker during use of the smoking article 30, it is not desirable for release of the payload 14 to occur prematurely. Where premature rupture and release has occurred, the filter material 22 of the filter rod 20 lacks integrity, which in turn affects the integrity of the smoking article 30. As such, it is desirable to separate the smoking articles 30 including one or more capsule objects 10 disposed therein that have ruptured from the smoking articles 30 including one or more capsule object 10 disposed therein that have not ruptured, before packaging. As such, smoking articles 30 having one or more capsule objects 10 disposed therein that have ruptured and released their payload 14 are removed from the manufacturing process before packaging.

FIG. 4 illustrates a still further exemplary smoking-related article. More particularly, FIG. 4 illustrates a smoking article 40, such as a cigarette, possessing certain representative components of a smoking article. The smoking article 40 includes in some aspects, a fuel source 42. As illustrated in FIG. 4, for example, the fuel source 42 is formed as a cylindrical rod of a charge or roll of smokeable filler material 44 (e.g., tobacco) contained in a circumscribing wrapping material. The ends of the fuel source 42 are axially spaced apart and are open to expose the smokeable filler material 44.

In some aspects, the smoking article 40 further includes a filter rod 20, similar or the same as a portion of the filter rod described in reference to FIG. 2. For example, the filter rod 20 comprises a filter material 22 having one or more capsule objects 10 disposed therein. However, in other aspects, the filter rod 20 has filter material 22 and is devoid of one or more capsule objects 10 disposed therein. The filter rod 20, or a portion thereof, is in some aspects, coaxially aligned with and axially spaced apart from the fuel source 42. A compartment 46 is defined therebetween via a foil wrapper 48 extending between the spaced-apart filter rod 20 and the fuel source 42, and wrapping about the filter rod 20 and the fuel source 42. The compartment 46 is capable of receiving one or more capsule objects 10 therein. In some aspects, the number, size, shape, and/or density of the capsule objects 10 disposed within the compartment 46 is dependent upon a volume of the compartment 46.

In some aspects, a volume of the compartment 46 is variable depending upon many factors including a length of the smoking article, ideal density of the capsule objects within the compartment, and material of the capsule objects having the desired properties. Preferred compartments 46 comprise an ideal volume. In some aspects, the ideal volume of the compartment is dependent upon the size and/or shape of the capsule object 10 or any other smoking-related article received therein, and a volume of the compartment 46 to be occupied by the payload 14, to be received therein.

As such, the compartment 46 is configured to receive and contain the one or more capsule objects 10, such as those described in reference to FIG. 1, therein. Alternatively, in addition to or instead of the capsule objects 10, the compartment 46 is configured to receive and contain one or more smoking-related articles of tobacco or tobacco-related material, such as granules, pellets, beads, discrete small units, carbon pieces, extruded carbon pieces, ceramic beads, marumarized tobacco pieces, extruded or compressed cylindrical or spherical elements, milled tobacco lamina, fillers, flavors, visible aerosol forming materials, binders, ovoid elements, irregularly shaped elements, shredded tobacco pieces or flakes, elements including tobacco, elements including a visible aerosol-forming material, adsorbent objects, absorbent objects, capsules, microcapsules, a honeycomb monolith, a single porous structure, and combinations thereof, disposed therein. As such, reference to "capsule objects 10" will be understood to also be applicable to and signify the various types of smoking-related articles disclosed herein. The one or more capsule objects 10 are configured to be disposed, inserted, introduced, and the like into the compartment 46 by a feed wheel or other suitable mechanism after having been determined to have integrity (e.g., the capsule objects have not ruptured after the foil wrapper 48 has been partially wrapped about the fuel source 42 and the filter rod 20 to form at least a bottom of the compartment 46). Once the one or more capsule objects 10 are disposed in the compartment 46, the remainder of the foil wrapper 48 (e.g., an aluminum wrapper) is wrapped about the spaced-apart filter rod 20 and the fuel source 42 in order to retain the capsule objects 10 therein and conduct heat from the lighting of the fuel source 42. In this manner, the foil wrapper 48 in cooperation with the filter rod 20 and fuel source 42 define the compartment 46. Consequently, the entirety of the smoking article 40 is then, in some aspects, wrapped with an overwrap (not shown) extending over the foil wrapper 48. Thus, in contrast to the smoking article 30 in FIG. 3, the smoking article 40 contains the one or more capsule objects 10 in the compartment 46 axially adjacent to the filter material 22, rather than within the filter material 22.

As such it is desirable to inspect the smoking article integrity to ensure that the ideal volume of the compartment is occupied by the one or more capsule objects disposed therein. Smoking articles 40 that comprise less than an ideal volume of the compartment occupied by the one or more capsule objects disposed therein, lack integrity, which in turn affects the integrity of the smoking article 40. As such, it is desirable to separate the smoking articles 40 including less than an ideal volume of the compartment occupied by the one or more capsule objects from the smoking articles 40 including having at least an ideal volume of the compartment occupied by the one or more capsule objects, before packaging. As such, smoking articles 40 having less than an ideal volume of the compartment occupied by the one or more capsule objects are removed from the smoking article manufacturing process before packaging.

In this regard, FIG. 5 illustrates a schematic diagram of an inspection system 50 configured to inspect smoking-related articles, generically 100. As previously described, the smoking-related articles include 100, for example, a capsule object 10 each including an outer shell 12 and a payload 14 disposed within the outer shell (see, e.g., FIG. 1), a filter rod 20 including a filter material 22 having one or more of the capsule objects 10 disposed therein (see, e.g., FIG. 2), a smoking article 30 each including a portion of the filter rod 20 having the one or more capsule objects 10 disposed therein (see, e.g., FIG. 3), a smoking article 40 having the one or more capsule objects 10 disposed in a compartment 46 (see, e.g., FIG. 4), etc. The inspection system 50 is also configured to inspect other types of smoking-related articles such as smokeless tobacco products, further embodiments of smoking articles, and the like.

The inspection system 50 includes, in some aspects at least one x-ray imaging device 60 and a smoking-related article transporting device 70. Further, the inspection system 50 includes in some aspects an analysis unit 90 that is in communication (e.g., operably engaged) with the x-ray imaging device 60 and is configured to analyze at least one image captured by the x-ray imaging device for each of the smoking-related articles 100. According to additional aspects, the at least one x-ray imaging device 60 is configured to capture one or more images of the one or more smoking-related articles 100 and output the one or more images to a device such as a monitor, which is connected to the at least one x-ray imaging device 60 and/or the analysis unit 90. In some embodiments, a network 80 (e.g., a wired or wireless network) is configured to transmit data (picture files, text files, video files) between some or all of the components of the inspection system 50. For example, the network 80 is configured to transmit the at least one image between the at least one x-ray imaging device 60 and the analysis unit 90 of the inspection system 50.

According to some embodiments, the at least one x-ray imaging device 60 includes, by way of example, an x-ray imaging mechanism (not shown) having an emitter capable of emitting x-ray radiation and a detector capable of detecting x-ray radiation and thus capturing one or more images (e.g., an x-ray image) of each of the smoking-related articles 100. In some aspects, the emitter of the x-ray imaging mechanism is a transmission mode soft x-ray tube, such as the N7599 series soft X-ray tube, from Hamamatsu Photonics, K.K. of Japan, which emits x-ray radiation that is blocked by denser materials and passes more easily through softer materials of the smoking-related articles. A soft x-ray tube advantageously emits lower energy, such as for example about 8 keV to about 12 keV, to image the smoking-related articles.

Since the payload material 14 (being a liquid) is denser than air, the x-ray radiation is more attenuated by the payload 14 than any air contained within the capsule objects 10. As such, for example, where the one or more images captured by the x-ray imaging device 60 includes, for example, an interior of the outer shell 12 of the capsule object 10, the resulting image shows a contrast between the payload 14 and any air contained within the outer shell 12, which is indicative of a density or a volume of the outer shell 12 of the capsule object 10 occupied by the payload 14. In another example, where the one or more images captured by the x-ray imaging device 60 includes, for example, a filter rod having one or more capsule objects 10 disposed within the filter material thereof, the resulting image shows a contrast between the payload 14 of each capsule object 10 and any air contained within the outer shell 12, which is indicative of a density volume of the outer shell 12 of the capsule object 10 occupied by the payload 14. In a still further example, where the one or more images captured by the x-ray imaging device 60 includes, for example, an interior of the compartment 46 of the smoking article 40, the resulting image shows a contrast between the payload 14 of each capsule object 10 and the unoccupied space (e.g., air) within the compartment 46, which is indicative of a density or a volume of the compartment 46 occupied by the capsule objects 10, or at least the payload 14 of each of the one or more capsule objects 10 within the compartment 46. These images thus represent a density of the capsule object 10 or the smoking article 40. Notably, if the resulting image does not show the expected contrast (e.g., ideal density) then the capsule or smoking article is defective.

The x-ray imaging device 60 is configured to capture the at least one image of the smoking-related articles 100 as the articles are sequentially introduced into the imaging zone 62 of the x-ray imaging device 60. The imagine zone 62 is defined as a field of view of the x-ray imaging device 60. As such, when the smoking-related article 100 passes through the imaging zone 62, the at least one x-ray imaging device 60 is configured to capture an image of the smoking-related articles 100 (e.g., an interior thereof). In another aspect, the at least one x-ray imaging device 60 is configured to capture images of the imaging zone 62 at predetermined intervals as a smoking-related article 100 is passing through. In some aspects, the predetermined intervals correspond with a particular timing where the smoking-related article transporting device 70 dispenses the smoking-related articles 100 to the detection zone 62. In yet another aspect, the smoking-related article transporting device 70 is configured to dispense the smoking-related articles 100 directly to another apparatus such as, for example, another transporting device, a weighing device, a measuring device, another imaging device, and the like (not shown).

Accordingly, the x-ray imaging device 60 is configured to capture images of the smoking-related articles 100 while the smoking-related articles 100 move at relatively high speeds (e.g., during the production thereof, during transport thereof prior to insertion into a filter rod or smoking article, during transport thereof after insertion into a filter rod or smoking article, etc.) Note that while imaging of the smoking-related articles 100 is preferably conducted during transport or movement thereof, in other embodiments, the smoking-related articles 100 are inspected while stationary or while moving at relatively lower speeds.

In some aspects, the inspection system 50 further comprises a control device 54 configured to control actuation of the x-ray imaging device 60 to image each of the smoking-related articles 100 sequentially introduced into the imaging zone 62, depending on the speed, the predetermined interval, and the like. The control device 54 is in some aspects connected to the network 80 along with the rest of the components of the inspection system 50. In this manner, not only is the control device 54 connected and in communication with the x-ray imaging device 60, but also with the rest of the components of the inspection system 50 such that the control device 54 is capable of controlling the other components as well (e.g., the smoking-related article transporting device 70, the analysis unit 90).

In some further aspects, the control device 54 is configured to synchronize actuation of the x-ray imaging device 60 with the smoking-related article transporting device 70 such that the x-ray imaging device 60 captures images of the smoking-related articles 100 as each of the smoking-related articles 100 is sequentially introduced into the imaging zone 62 by the smoking-related article transporting device 70. For example, a sensor (not shown) associated with the smoking-related article transporting device 70 is configured to sense a first portion of the smoking-related article 100 being introduced into the imaging zone 62, which then triggers actuation of the x-ray imaging device 60.

In this regard, the smoking-related article transporting device 70 is configured to sequentially introduce the smoking-related articles 100 into the imaging zone 62. The smoking-related article transporting device 70 is both functionally and structurally configured depending on the type of smoking-related article 100 being transported thereby. As such, a smoking-related article transporting device 70 configured to sequentially introduce one or more capsule objects (see, e.g., FIGS. 6A-6F) may differ from a smoking-related article transporting device 70 configured to sequentially introduce one or more filter rods each including filter material having one or more capsule objects disposed therein (see, e.g., FIGS. 7A-7C). However, such smoking-related article transporting devices 70 may be substantially similar for substantially similar smoking-related articles, such as filter rods and smoking articles (see, e.g., FIGS. 7A-7C).

The smoking-related article transporting device 70 is configured to receive the smoking-related articles 100 for sequential introduction into the imaging zone 62, from a repository 52 configured to handle and/or store a plurality of the smoking-related articles 100. Desirably, the repository 52 is configured to store the plurality of smoking-related articles 100 without any significant degree of premature and/or undesirable breakage thereof. In some embodiments, the repository 52 defines an orifice that is in communication and operably engaged with the smoking-related article transporting device 70. In one aspect, gravity urges the smoking-related articles 100 though the orifice defined by the repository 52. Additionally or alternatively, the repository 52 includes a rotatable arm or other actuator within the interior volume of the repository 52 configured to urge the smoking-related articles 100 through the orifice and to the smoking-related article transporting device 70.

The inspection system 50 further comprises the analysis unit 90 that is in communication with the x-ray imaging device 60 and is configured to analyze the at least one image captured by the x-ray imaging device 60 for each of the smoking-related articles 100. The analysis unit 90 is described in more detail below in FIG. 10. In some aspects, the analysis unit 90 is configured to execute an inspection tool 92 configured to determine values for one or more parameters of each of the smoking-related articles 100 based on the analysis of the at least one image. The one or more parameters of each of the smoking-related articles 100 comprise, in some aspects, a weight, a size, a shape, a density, and the like. As used herein, the parameter determined by the inspection tool 92 is desirably a density related to and associated with a volume of the outer shell 12 occupied by the payload 14 of a capsule object 10, or a volume of the compartment 46 occupied by one or more capsule objects 10.

In addition, the analysis unit 90 is also configured to execute a comparison tool 94 that is configured to determine an acceptability of the smoking-related articles 100 for further processing. For example, the comparison tool 94 is configured to determine an acceptability for further processing based on comparing the determined (actual) values for the one or more parameters to ideal values for the one or more parameters, wherein the smoking-related articles 100 acceptable for further processing have determined values of the one or more parameters at least equivalent to the ideal values for the one or more parameters and the smoking-related articles 100 not acceptable for further processing have determined values of the one or more parameters less than the ideal values for the one or more parameters.

Accordingly, the following provides exemplary inspection systems for different types of smoking-related articles. While these exemplary inspection systems may be different for each type of smoking-related article, these inspection systems are not described independently of one another and one or more components of one inspection system are suitable for use in another inspection system.

Figure 6A:
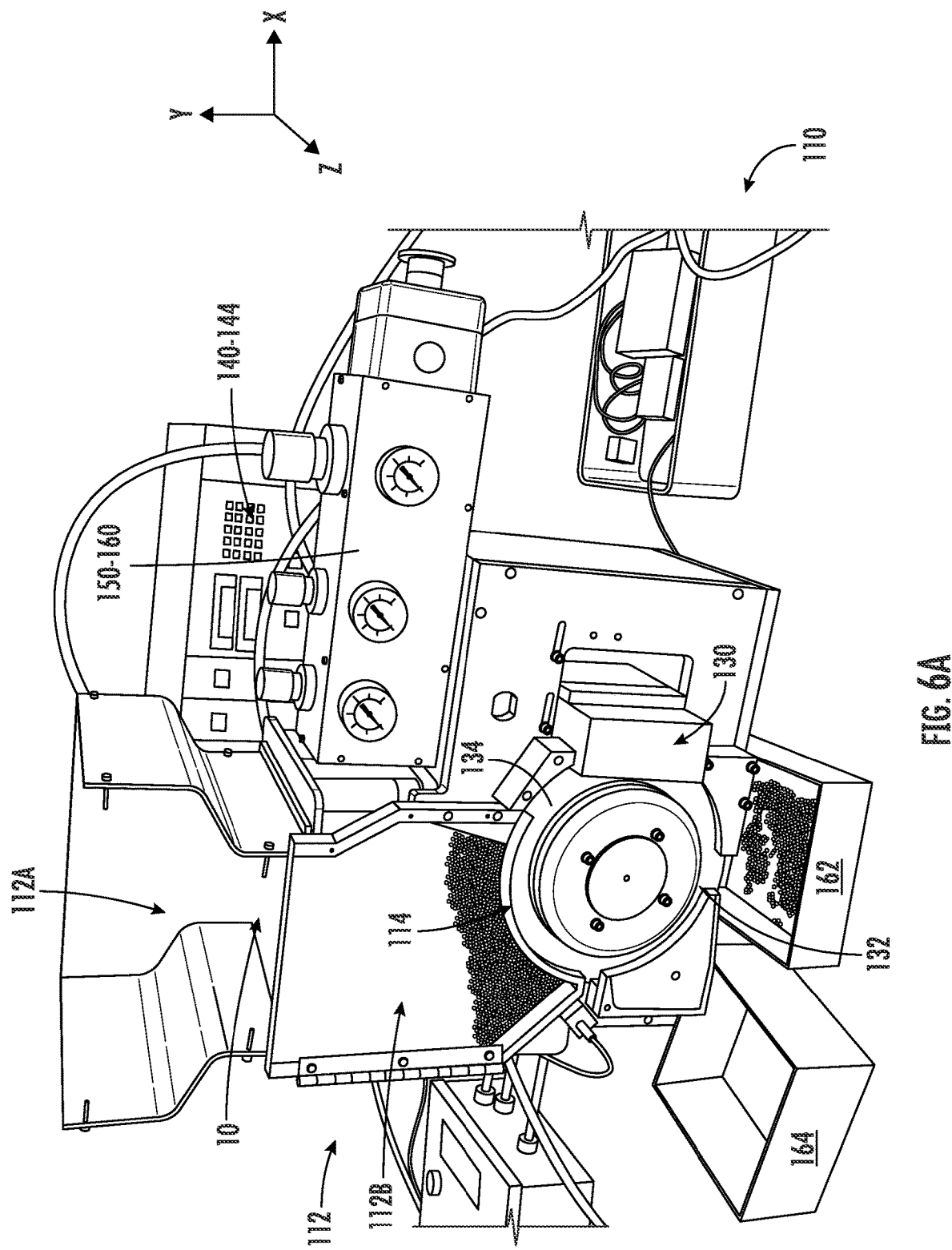

In FIGS. 6A-6C various views of an inspection system 110 for inspecting one or more capsule objects (hereinafter referred to as "capsule objects"), are provided. The inspection system 110 is similar to the inspection system 50 illustrated in FIG. 5 and includes a network (e.g., network 80, FIG. 5) able to connect all the components described in relation thereto. Such capsule objects 10 inspected by the inspection system 110 each include an outer shell 12 and a payload 14 disposed within the outer shell 12, the capsule objects 10 being the same as or similar to the capsule objects 10 described in reference to FIG. 1.

The inspection system 110 comprises a repository 112 configured to handle and/or store a plurality of the capsule objects 10. The inspection system 110 further comprises an x-ray imaging device 120 and a capsule object transporting device 130 that is configured to sequentially introduce the capsule objects 10 into an imaging zone 122 defined by a field of view of the x-ray imaging device 120. The capsule object transporting device 130 is configured to receive the capsule objects 10 from the repository 112. Further, the inspection system 110 includes in some aspects an analysis unit 140 (see, e.g., FIG. 6A) that is in communication (e.g., operably engaged) with the x-ray imaging device 120 and is configured to analyze at least one image captured by the x-ray imaging device 120 for each of the capsule objects 10.

More particularly, and as illustrated in FIGS. 6A-6C, the repository 112 comprises a first section 112A and a second section 112B. The first section 112A of the repository is formed in some aspects as a hopper and is configured to store the plurality of the capsule objects 10 without any significant degree of premature and/or undesirable breakage thereof. The first section 112A is configured to receive the plurality of capsule objects 10 from other mechanisms responsible for earlier stages of manufacturing, such as a capsule object forming mechanism (not shown). The first section 112A of the repository is in operable engagement with the second section 112B of the repository. For example, the first and section sections 112A, 112B of the repositories are connected through a mutually extending opening in both sections that allows the plurality of capsule objects 10 to be urged from the first section 112A to the second section 112B, where the second section 112B is provided substantially perpendicularly to the first section 112A (e.g., below the first section 112A). In some instances, for example, the second section 112B of the repository comprises smaller dimensions than dimensions of the first section 112A. In this manner, the mutually extending opening acts as a funnel to urge, via gravity or an actuation mechanism, the plurality of capsule objects 10 from a larger space in the first section 112A to a smaller space in the second section 112B. As illustrated in FIG. 6A, for example, the second section 112B is formed such that the plurality of capsule objects 10 are funneled into the second section 112B such that the capsule objects 10 are retained therein only one capsule deep. Notably, however, other dimensions, sizes, shapes, and/or associations between the first portion 112A of the repository and the second portion 112B of the repository are contemplated.

In some instances, the second section 112B defines an orifice 114 that is in communication and operably engaged with the capsule object transporting device 130. In one aspect, gravity urges the capsule objects 10 though the orifice 114 defined by second section 112B. Additionally or alternatively, the second section 112B includes a rotatable arm or other actuator within the interior volume of the second section 112B to urge the capsule objects 10 through the orifice 114 and onto the capsule object transporting device 130. Alternatively, the first portion 112A and the second portion 112B are formed as one unitary component, such that the capsule objects 10 are both held and transferred to the capsule object transporting device 130 within the same repository section.

The capsule object transporting device 130 comprises in some aspects a feed wheel 132 rotating about an axis and having a circumferential outer edge 134 defining a plurality of cavities 136 thereabout. Each of the plurality of cavities 136 is configured in some aspects to receive a single one of the capsule objects 10 therein. As such, the circumferential outer edge 134 of the feed wheel 132 of the capsule object transporting device 130 is configured to be arranged with respect to the orifice 114 defined by the repository 112 to receive a single one of the capsule objects 10 therein via gravity or an actuation mechanism such as those described above.

Accordingly, where the capsule object transporting device 130 comprises the feed wheel 132, the orifice 114 defines a curved opening that matches a curvature of the feed wheel. Thus, when one of the plurality of cavities 136 of the feed wheel 132 is aligned with the orifice 114 defined by the repository 112, a capsule object 10 is transported from the repository 112 to the cavity 136. According to some aspects, the plurality of cavities 136 are in fluid communication with a vacuum pressure arrangement 150 configured to apply a vacuum pressure to each of the plurality of cavities 136 of the feed wheel 132 to retain the capsule objects 10 received therein. As such, when a cavity 136 aligns with the orifice 114 of the repository 112, the suction force provided by the vacuum pressure arrangement 150 is configured to urge a capsule object 10 from the repository 112 and into a single one of the plurality of cavities 136. The vacuum pressure arrangement 150 is then configured to retain the capsule object 10 within a single one of the plurality of cavities 136 as the feed wheel 132 rotates about the axis.

As more particularly illustrated in FIGS. 6D-6F, which illustrate an exemplary feed wheel 132, the x-ray imaging device 120 is disposed proximate to the circumferential outer edge 134 of the feed wheel 132. For example, the x-ray imaging device 120 is disposed approximately perpendicular to the circumferential outer edge 134 of the feed wheel 132. In this manner, the field of view of the x-ray imaging device 120 is determined by the disposition thereof, such that the field of view of the x-ray imaging device encompasses a portion of the circumferential outer edge 134 of the feed wheel 132 (e.g., the emitter and detector and disposed on opposing sides of the feed wheel 132 such that the capsule object 10 in each cavity 136 passes through the field of view/imaging zone 122). In some aspects, the x-ray imaging device 120 is disposed stationary relative to the rotation of the feed wheel 132. Accordingly, the imaging zone 122 defined by the field of view is also stationary, such that rotation of the feed wheel 132 results in sequentially introducing capsule objects 10 disposed in a single one of the cavities 136 into the imaging zone 122.

As previously disclosed, the feed wheel 132 is configured to sequentially introduce the capsule objects 10 to the imaging zone 122 at predetermined intervals. For example, the plurality of cavities 136 defined by the feed wheel 132 are arranged along the circumferential outer edge 134 at equal angular intervals. Accordingly, the rotational speed of the feed wheel 132 defines the intervals between the introductions of each of the capsule objects 10 to the imaging zone 122. For example, if the rotational speed of the feed wheel 132 increases, the interval between the introduction of each of the capsule objects 10 decreases. Likewise, if the rotational speed of the feed wheel 132 decreases, the interval between when each of the capsule objects 10 is introduced to the imaging zone 122 will increase. Thus, the x-ray imaging device 120 is configured to capture the at least one image of each of the capsule objects 10 as the capsule objects 10 are sequentially introduced into the imaging zone 122 by rotation of the feed wheel 132.

In some aspects, the analysis unit 140 is then configured to receive the at least one image from the x-ray imaging device 120 and analyze the at least one image captured thereby for each of the capsule objects 10.

The analysis unit 140 thus includes, in some aspects, an inspection tool 142 that is configured to determine a capsule object integrity of each of the capsule objects 10 based on the analysis of the at least one image of the capsule object 10 captured by the x-ray imaging device 120. In some aspects, the "capsule object integrity" of each of the capsule objects is determined by a volume of the outer shell 12 occupied by the payload 14. More particularly, the at least one image received from the x-ray imaging device 120 includes an image of the contents (or lack of contents) of an interior of one of the plurality of capsule objects 10, wherein there is evident a contrast between any quantity of the payload 14 (e.g., liquid) within the outer shell 12 of the capsule object 10 and any air within the outer shell 12 of the capsule object 10, since the payload material is denser than air. In some aspects, the inspection tool 142 is then configured to determine a volume of the outer shell 12 that is occupied by the payload 14.

The analysis unit 140 further includes, in some aspects, a comparison tool 144 that is configured to determine whether each of the capsule objects 10 is acceptable for further processing. In this manner, the comparison tool 144 is capable of receiving the actual/determined capsule object integrity determined by the inspection tool 142 and comparing the actual/determined capsule object integrity against an ideal capsule object integrity. The ideal capsule object integrity is, in some aspects, an ideal volume of the outer shell occupied by the payload that has been predetermined and stored in a data storage associated with the analysis unit 140. The ideal capsule object integrity is in these aspects based on a size, shape, material, application, etc., of the capsule object. For example, an ideal capsule object integrity comprises a range of about 19.00 mg to about 23 mg; and preferably is about 21 mg.

The comparison tool 144 is thus able to determine whether the capsule objects 10 so imaged are acceptable or not acceptable for further processing. For example, the capsule objects 10 acceptable for further processing have a determined volume of the outer shell 12 occupied by the payload 14 at least equivalent to the ideal volume of the outer shell 12 occupied by the payload 14. In another example, the capsule objects not acceptable for further processing have a determined volume of the outer shell 12 occupied by the payload 14 less than the ideal volume of the outer shell 12 occupied by the payload 14.

In some aspects, as illustrated in FIG. 6A in particular, the feed wheel 132 is configured to separate any of the capsule objects 10 acceptable for further processing from any of the capsule objects not acceptable for further processing 10 based on the status of the individual capsule objects as determined by the comparison tool 144. To this end, the feed wheel 132 additionally comprises an air injector 160 configured to emit pressurized air having a positive pressure greater than the vacuum pressure. The air injector 160 is configured to be controlled to apply the pressurized air to one of the plurality of cavities 136 at a first (angular) location along the circumferential outer edge 134 of the feed wheel 132 to eject the capsule object 10 from the one of the plurality of cavities 136, if the capsule object 10 therein is determined by the comparison tool 144 to be acceptable for further processing, and is configured to apply the pressurized air to the one of the plurality of cavities 136 at a second (angular) location along the circumferential outer edge 134 of the feed wheel 132 to eject the capsule object 10 from the one of the plurality of cavities 136, if the capsule object 10 therein is determined by the comparison tool 144 to not be acceptable for further processing.

For example, when a capsule object 10 is determined by the comparison tool 144 of the analysis unit 140 to be acceptable for further processing (e.g., as a result of having the determined volume of the outer shell 12 occupied by the payload 14 at least being equivalent to the ideal volume of the outer shell 12 occupied by the payload 14 or other parameter meeting values based on the at least one image captured by the x-ray imaging device 120), the air injector 160 is configured to apply the pressurized air to one of the plurality of cavities 136 at the first location along the circumferential outer edge 134 of the feed wheel 132 to eject the capsule object 10 from the one of the plurality of cavities 136 and into a first container or flow path 162. This container or flow path 162 will enable the acceptable capsule objects 10 to be further processed. In some aspects, the acceptable capsule objects 10 will be directed to a storage unit prior to transporting the acceptable capsule objects to a smoking-related article or smoking article production apparatus or system (e.g., a filter rod production device). Alternatively, the acceptable capsule objects 10 are directly transported to the smoking-related article or smoking article production apparatus or system.

In another example, when a capsule object 10 is determined by the comparison tool 144 of the analysis unit 140 to not be acceptable for further processing (e.g., as a result of having the determined volume of the outer shell 12 occupied by the payload 14 less than the ideal volume of the outer shell 12 occupied by the payload 14 or other parameter not meeting values based on the least one image captured by the x-ray imaging device 120), the air injector 160 is configured to apply the pressurized air to one of the plurality of cavities 136 at the second location along the circumferential outer edge 134 of the feed wheel 132 to eject the capsule object 10 from the one of the plurality of cavities 136 and into a second container or flow path 164. This container or flow path 164 will prevent the rejected capsule objects 10 from being further processed. More information on the sorting of the capsule objects based on status is described, for example, in U.S. Pat. No. 8,905,243 to Dixon et al., which is incorporated herein by reference in its entirety.

Figure 7A:
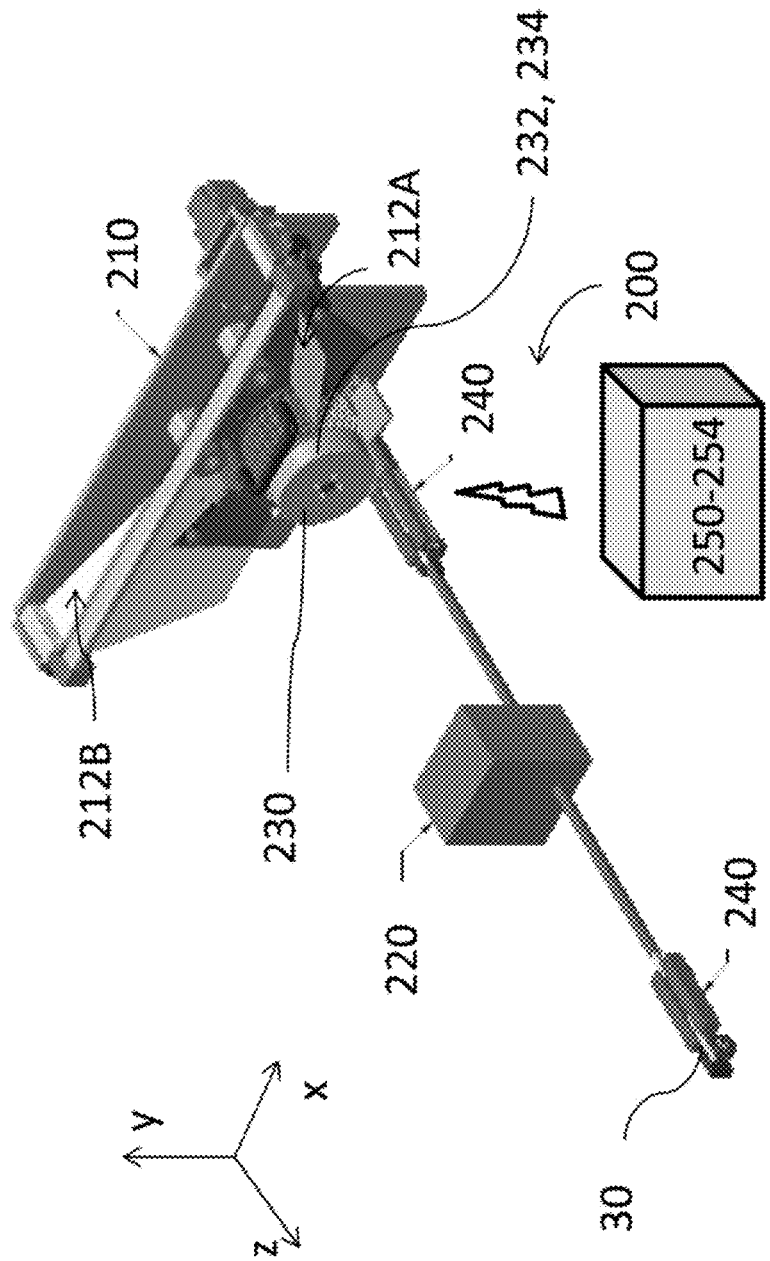

In FIGS. 7A-7C various views of an inspection system 200 for inspecting filter rods 20 (see, e.g., FIG. 2) or smoking articles 30 each incorporating a portion of the filter rods 20 (see, e.g., FIG. 3), are provided. The inspection system 200 is similar to the inspection system 50 illustrated in FIG. 5 and includes a network (e.g., network 80, FIG. 5) configured to connect all the components described in relation thereto. The filter rods 20 each include a filter material 22 having one or more of the capsule objects 10 disposed therein. The smoking articles 30 each include a portion of the filter rod 20 having one or more of the capsule objects 10 disposed therein, where the portion of the filter rod 20 is coaxially aligned and serially engaged with an axially extending fuel source 32. The capsule objects 10 are the same or similar capsule objects as those described in reference to FIG. 1 and are previously inspected in an inspection system the same as or similar to that described above in reference to the inspection system 110 in FIGS. 6A-6F. Thus, the one or more capsule objects 10 disposed in the filter material 22 of the filter rods or portions thereof 20 have all been determined to be acceptable for further processing at least prior to being introduced into the filter material 22.

However, further inspection via the inspection system 200 is desirable during further stages of processing described herein (e.g., storage of the capsule objects 10, transportation of the capsule objects 10, insertion of the capsule objects 10 into the filter material 22, division of the filter rods into discrete portions, etc.) since the capsule objects 10 are subjected to further handling and could rupture. Thus, the inspection system 200 is configured to perform a similar or substantially similar analysis to the inspection system 110 by inspecting the integrity of the capsule objects 10 as disposed in situ within the filter material of the filter rods 20 or portions thereof during further stages of manufacturing.

Notably, the inspection system 200 is suitable for inspecting both the filter rods 20 having the one or more capsule objects 10 disposed therein and the smoking articles 30 each including a portion of the filter rod 20 having the one or more capsule objects 10 disposed therein. Preferably, the inspection system 200 inspects either the filter rods 20 or the smoking articles 30 at one time. Thus, although the inspection system 200 is described as being suitable for inspecting both the filter rods 20 and the smoking articles 30, it is preferable that only one type of smoking-related article is inspected by the system 200 at one time.

The inspection system 200 comprises a repository configured as a hopper 210 configured to handle and/or store a plurality of the filter rods 20 or smoking articles 30, or can be implemented in-line in the manufacturing process. The inspection system 200 further comprises an x-ray imaging device 220. A filter rod transporting device 230 is configured to receive the plurality of the filter rods 20 or smoking articles 30 from the repository 210 and transfer them to a filter rod conveying device 240. The filter rod conveying device 240 is configured to sequentially introduce the plurality of the filter rods 20 or smoking articles 30 into an imaging zone 222 (see, e.g., FIG. 7C) defined by a field of view of the x-ray imaging device 220. Further, the inspection system 200 includes in some aspects an analysis unit 250 that is in communication (e.g., operably engaged) with the x-ray imaging device 220 and is configured to analyze at least one image captured by the x-ray imaging device 220 for each of the plurality of the filter rods 20 or smoking articles 30.

More particularly, and as illustrated in FIGS. 7A-7C, the hopper 210 is configured to store either the plurality of the filter rods 20 or smoking articles 30 without any significant degree of premature and/or undesirable breakage thereof. One or more inclines 212A, 212B are associated with the hopper 210 to urge the plurality of the filter rods 20 or smoking articles 30 toward the filter rod transporting device 230. In some instances, the inclines 212A, 212B are operably engaged between the hopper 210 and the filter rod transporting device 230 to guide the plurality of the filter rods 20 or smoking articles 30 from the hopper 210 to the filter rod transporting device 230. In one aspect, gravity urges the plurality of the filter rods 20 or smoking articles 30 along the inclines 212A, 212B toward the filter rod transporting device 230. Additionally or alternatively, the hopper 210 includes an actuator associated with one or both of the inclines 212A, 212B to urge the plurality of the filter rods 20 or smoking articles 30 along the inclines 212A, 212B toward the filter rod transporting device 230. Alternatively, there may be one, three, four, five, etc., inclines at different dispositions relative to one another to transport the plurality of the filter rods 20 or smoking articles 30 from the hopper 210 to the filter rod transporting device 230 so as to prevent jamming of the filter rods or smoking articles within the hopper.

The filter rod transporting device 230 comprises in some aspects a peripheral surface 232 defining a plurality of grooves 234 each extending parallel to a rotational axis of the filter rod transporting device 230. Each of the plurality of grooves 234 is configured in some aspects to receive a single one of the filter rods 20 or smoking articles 30 therein such that a longitudinal axis of the single one of the filter rods 20 or smoking articles 30 is parallel to the rotational axis of the filter rod transporting device 230. As such, the peripheral surface 232 of the filter rod transporting device 230 is configured to be arranged adjacent to the inclines 212A, 212B to receive a single one of the filter rods 20 or smoking articles 30 therein in each of the grooves 234 via gravity or an actuation mechanism such as those described above.

Accordingly, when one of the plurality of grooves 234 of the filter rod transporting device 230 is aligned with an end of one of the inclines 212A, 212B, a single one of the filter rods 20 or smoking articles 30 is able to roll from the edge of the inclines 212A, 212B and into a single one of the plurality of grooves 234. According to some aspects, the plurality of grooves 234 are in fluid communication with a vacuum pressure arrangement 260 (see, e.g., FIG. 7B) configured to apply a vacuum pressure to each of the plurality of grooves 234 of the filter rod transporting device 230 to retain the single one of the filter rods 20 or smoking articles 30 received therein. As such, when a groove 234 aligns with the edge of the inclines 212A, 212B, the suction force provided by the vacuum pressure arrangement 260 is configured to urge the single filter rod 20 or smoking article 30 from the incline 212A, 212B and into a single one of the plurality of grooves 234. The vacuum pressure arrangement 260 is then configured to retain the filter rods 20 or smoking articles 30 within a single one of the plurality of grooves 234 as the filter rod transporting device 230 rotates about the longitudinal axis.

In some aspects, the filter rod transporting device 230 is also configured to eject the filter rods 20 or smoking articles 30 from a particular groove 234 when the particular groove is positioned to dispense the filter rods 20 or smoking articles 30 to the imaging zone 222. In another aspect, the filter rod transporting device 230 is configured to eject the filter rods 20 or smoking articles 30 from a particular groove 234 when the particular groove 234 is positioned to dispense the filter rods 20 or smoking articles 30 to another device associated with the imaging zone 222 such as, for example, the filter rod conveying device 240. In this aspect, and as illustrated in FIGS. 7A-7C, filter rod transporting device 230 is configured such that the filter rod conveying device 240 is disposed proximate thereto and extends parallel to the rotation axis thereof. As such, the filter rod transporting device 230 is configured such that when a groove 234 is positioned directly adjacent to the filter rod conveying device 240, the vacuum source 260 that is operably engaged and in fluid communication with the filter rod transporting device 230 no longer provides a suction force to the particular groove 234 that is positioned to dispense the filter rods 20 or smoking articles 30. In another aspect, the filter rod transporting device 230 is configured such that when a groove 234 is positioned directly adjacent to the filter rod conveying device 240, a fluid source 270 (see, e.g., FIG. 7B) is configured to provide a flow of a fluid (e.g., compressed air) to the groove 234. In some aspects, this injection of the compressed air into the groove 234 is configured to overcome the suction force that is provided by the vacuum source 260. In another aspect, the vacuum source 260 no longer provides the suction force to the appropriately positioned groove 234 and the injection of compressed air is configured to urge the filter rods 20 or smoking articles 30 towards the filter rod conveying device 240.

As previously disclosed, the filter rod conveying device 240 is configured to receive the filter rods 20 or smoking articles 30 from the grooves 234 of the filter rod transporting device 230 and to transport the filter rods 20 or smoking articles 30 sequentially and parallel to the longitudinal axis of the filter rod/smoking article. More particularly, the filter rod conveying device 240 comprises a conveyor that continuously moves at a predetermined speed. Once the filter rod conveying device 240 receives the filter rods 20 or smoking articles 30, the filter rod conveying device 240 is configured to sequentially introduce the filter rods 20 or smoking articles 30 along the longitudinal axis thereof into the imaging zone 222 defined by the field of view of the x-ray imaging device 220, at predetermined intervals as defined by the filter rod transporting device 230. For example, the plurality of grooves 234 defined by the filter rod transporting device 230 are arranged about the peripheral surface 232 at equal angular intervals. Accordingly, the rotational speed of the filter rod transporting device 230 defines the intervals between the introductions of the filter rods 20 or smoking articles 30 to the filter rod conveying device 240. For example, if the rotational speed of the filter rod transporting device increases, the interval between the introductions of the filter rods 20 or smoking articles 30 decreases. Likewise, if the rotational speed of the filter rod transporting device decreases, the interval between when each of the filter rods 20 or smoking articles 30 are introduced to the filter rod conveying device 240 will increase. Thus, the filter rod conveying device 240 is configured to transport the filter rods 20 or smoking articles 30 such that the filter rods 20 or smoking articles 30 are sequentially introduced along the longitudinal axis thereof into the imaging zone 222 defined by the field of view of the x-ray imaging device 220.

The x-ray imaging device 220 is disposed proximate to the filter rod conveying device 240 and is configured to capture the at least one image of each of the axially extending filter rods or filter rod portions as the filter rods 20 or smoking articles 30 are sequentially introduced along the longitudinal axis thereof into the imaging zone. For example, the x-ray imaging device 220 is disposed substantially perpendicularly to the filter rod conveying device 240 relative to the direction of transport of the filter rods 20 or the smoking articles 30. In this manner, the field of view of the x-ray imaging device 220 is determined by the disposition thereof, such that the field of view of the x-ray imaging device encompasses a portion of the filter rod conveying device 240. In some aspects, the x-ray imaging device 220 is disposed stationary relative to the transport of the filter rods 20 or smoking articles 30 parallel to the longitudinal axis thereof or otherwise parallel to the rotational axis of the filter rod transporting device 230. Accordingly, the imaging zone 222 defined by the field of view is also stationary, such that transport of the filter rods 20 or smoking articles 30 via a conveyor (the filter rod conveying device 240) results in sequentially introducing the axially extending filter rods 20 or filter rod portions of each of the smoking articles 30 into the imaging zone 222 along the longitudinal axis thereof. As such, the x-ray imaging device 220 is configured to capture the at least one image of the each of the axially extending filter rods 20 or filter rod portions of each of the smoking articles 30 as the filter rods are transported on the filter rod conveying device 240 parallel to the longitudinal axis thereof (parallel to the rotational axis of the filter rod transporting device 230).

In some aspects, the analysis unit 250 is then configured to receive the at least one image from the x-ray imaging device 220 and is configured to analyze the at least one image captured thereby for each of the filter rods 20 or filter rod portions of each of the smoking articles 30. The analysis unit 250 thus includes, in some aspects, an inspection tool 252 that is configured to determine a filter rod integrity of each of the filter rods 20 or filter rod portions of each of the smoking articles 30 based on the analysis of the at least one image of the capsule objects 10 within the filter rod 20 or filter rod portion of each of the smoking articles 30 captured by the x-ray imaging device 220. In some aspects, the "filter rod integrity" of each of the filter rods 20 or filter rod portions of each of the smoking articles 30 is determined by a volume of the outer shell 12 that is occupied by the payload 14 for each of the one or more capsule objects 10 disposed in the filter material 22 of the filter rod 20 or filter rod portion of each of the smoking articles 30. More particularly, the at least one image received from the x-ray imaging device 220 includes an image of one of the plurality of capsule objects 10, where any quantity of the payload 14 within the outer shell 12 of the capsule object 10 is demonstrates a contrast with any air within the outer shell 12 of the capsule object 10, since the payload material (liquid) is denser than air. The inspection tool 252 is then configured to determine the volume of the outer shell 12 that is occupied by the payload 14 for each of the one or more capsule objects 10 disposed in the filter material 22 of the filter rod 20 or filter rod portion of each of the smoking articles 30.

The analysis unit 250 further includes, in some aspects, a comparison tool 254 that is configured to determine whether each of the filter rods 20 or smoking articles 30 is acceptable for further processing. In this manner, the comparison tool 254 is capable of receiving the filter rod integrity determined by the inspection tool 252 and using the determined filter rod integrity to compare it against an ideal filter rod integrity. The ideal filter rod integrity is, in some aspects, an ideal volume of the outer shell occupied by the payload for each of the one or more capsule objects 10 disposed in the filter material 22 of the filter rod 20 or filter rod portion of a smoking article 30 that has been predetermined and stored in a data storage associated with the analysis unit 250. The ideal filter rod integrity is, in these aspects, based on a size, shape, material, application, etc., of the filter rods 20 or smoking articles 30. For example, the ideal filter rod integrity is about 73 mg to about 81 mg; and preferably about 77.24 mg.

The comparison tool 254 is thus able to determine whether or not the filter rods 20 or smoking articles 30 including the filter rod portions so imaged are acceptable or not acceptable for further processing. For example, the filter rods 20 or smoking articles 30 acceptable for further processing have a determined volume of the outer shell 12 that is occupied by the payload 14 at least equivalent to an ideal volume of the outer shell 12 occupied by the payload 14 for each of the one or more capsule objects 10 disposed in the filter material 22 of the filter rod 20 or filter rod portion of each of the smoking articles 30. In another example, the filter rods 20 or smoking articles 30 not acceptable for further processing have a determined volume of the outer shell 12 occupied by the payload 14 less than the ideal volume of the outer shell 12 occupied by the payload 14 for at least one of the one or more capsule objects 10 disposed in the filter material 22 of the filter rod 20 or filter rod portion of each of the smoking articles 30.

In some aspects, the filter rod conveying device 240 is configured to sort the filter rods 20 or smoking articles 30, so as to separate any of the filter rods 20 or smoking articles 30 acceptable for further processing from any of the filter rods 20 or smoking articles 30 not acceptable for further processing 10 based on the status as determined by the comparison tool 254. To this end, the filter rod conveying device 240 is configured to divert the acceptable filter rods 20 or smoking articles 30 (e.g., as a result of having a determined volume of the outer shell 12 that is occupied by the payload 14 at least equivalent to the ideal volume of the outer shell 12 occupied by the payload 14 for each of the one or more capsule objects 10 disposed in the filter material 22 of the filter rod 20 or filter rod portion of each of the smoking articles 30 or other parameter meeting values based on the at least one image captured by the x-ray imaging device 220) to one path or storage location and the not acceptable filter rods 20 or smoking articles 30 (e.g., as a result of having a determined volume of the outer shell 12 occupied by the payload 14 less than the ideal volume of the outer shell 12 occupied by the payload 14 for at least one of the one or more capsule objects 10 disposed in the filter material 22 of the filter rod 20 or filter rod portion of each of the smoking articles 30 or other parameter not meeting values based on the least one image captured by the x-ray imaging device 120), to another path or storage location. In some aspects, the articles with the acceptable filter rods 20 will be directed to a storage unit prior to transporting the articles with the accepted filter rods to a smoking-related article or smoking article producer or production apparatus. Alternatively, the acceptable filter rods 20 are directly transported to the smoking article producer or production apparatus. In other aspects, the acceptable smoking articles 30 will be directed to a storage unit prior to packaging or will be directly transported to a packaging apparatus.

Figure 8:
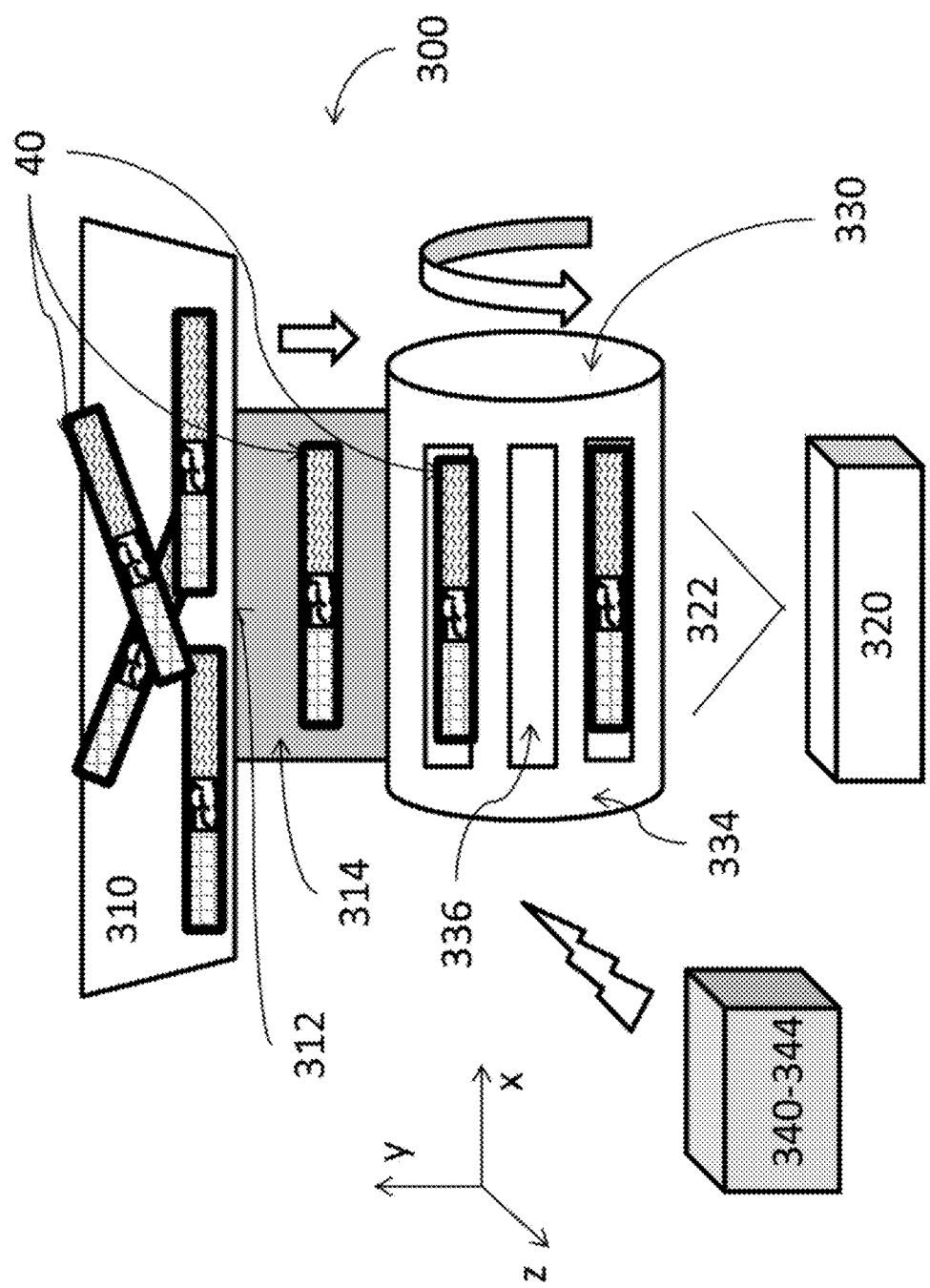
FIG. 8 illustrates a front view of an inspection system configured to inspect the smoking article of FIG. 4 according to one example aspect of the present disclosure.

In FIG. 8 an inspection system 300 for inspecting smoking articles 40 (see, e.g., FIG. 4) is provided. The inspection system 300 is similar to the inspection system 50 illustrated in FIG. 5 and includes a network (see, e.g., network 80, FIG. 5) configured to connect all the components described in relation thereto. The smoking articles 40 each include a filter rod coaxially aligned with and axially spaced apart from an axially extending fuel source, with a portion of each of the filter rod and the fuel source being circumscribed by a foil wrapper, such that the filter rod, the fuel source and the foil wrapper cooperate to define a compartment therebetween. The compartment has one or more of the capsule objects 10 disposed therein. Alternatively, in addition to or instead of the capsule objects 10, the compartment 46 has one or more smoking-related articles of tobacco or tobacco-related material, such as granules, pellets, beads, discrete small units, carbon pieces, extruded carbon pieces, ceramic beads, marumarized tobacco pieces, extruded or compressed cylindrical or spherical elements, milled tobacco lamina, fillers, flavors, visible aerosol forming materials, binders, ovoid elements, irregularly shaped elements, shredded tobacco pieces or flakes, elements including tobacco, elements including a visible aerosol-forming material, adsorbent objects, absorbent objects, capsules, microcapsules, a honeycomb monolith, a single porous structure, and combinations thereof, disposed therein. As such, reference to "capsule objects 10" will be understood to also be applicable to and signify the various types of smoking-related articles disclosed herein. As noted above, the filter rods 20 included in the smoking articles 40 differ from the portion of the filter rods 20 included in the smoking articles 30 described in reference to FIG. 3 in that the filter rods 20 included in the smoking article 40 are devoid of one or more capsule objects being disposed within the filter material 22. However, in some aspects, the filter rods 20 included in the smoking articles 40 in some embodiments have one or more capsule objects disposed within the filter material similar to the portions of the filter rods 20 of the smoking articles 30 in FIG. 3.

The capsule objects 10 are the same or similar capsule objects described in reference to FIG. 1 and are inspected in an inspection system that is the same as or similar to that described above in reference to the inspection system 110 in FIGS. 6A-6F. Thus, the one or more capsule objects 10 disposed in the compartment 46 of the smoking article 40 have all been determined to be acceptable for further processing. However, further inspection via the inspection system 300 is, in some aspects, desirable as during further stages of processing described herein (e.g., storage of the capsule objects 10, transportation of the capsule objects 10, insertion of the capsule objects 10 into the compartment 46 of the smoking article 40, etc.) the capsule objects 10 are subjected to further handling and could rupture. Thus, in some aspects, the inspection system 300 is configured to perform a similar or substantially similar analysis to the inspection system 110 by inspecting the integrity of the capsule objects 10 as disposed within the filter material of the filter rods 20 or portions thereof during further stages of manufacturing. In some additional aspects, the inspection system 300 is also configured to determine a density of the smoking articles within the compartment or whether the correct number of un-ruptured capsule objects 10 are disposed within the compartment of the smoking article 40.

The inspection system 300 thus comprises a repository 310 or other type of manufacturing mechanism configured to handle, manufacture, and/or store the plurality of smoking articles 40. The inspection system 300 further comprises an x-ray imaging device 320. A smoking article transporting device 330 is configured to receive the smoking articles 40 from the repository 310 and sequentially introduce the smoking articles 40 into an imaging zone 322 defined by a field of view of the x-ray imaging device 320. Further, the inspection system 300 includes in some aspects an analysis unit 340 that is in communication (e.g., operably engaged) with the x-ray imaging device 320 and is configured to analyze at least one image captured by the x-ray imaging device 320 for each of the smoking articles 40.

More particularly, and as illustrated in FIG. 8, the repository 310 is configured to store the smoking articles 40 without any significant degree of premature and/or undesirable breakage of the capsule objects 10 disposed in the compartment thereof. In some aspects, the repository 310 is formed as a hopper. An orifice 312 is defined at a bottom of the repository 310. The orifice 312 is, in some aspects, in communication and/or operably engaged with one or more inclines 314 that descend from the repository at an angle toward the smoking article transporting device 330. The one or more inclines 314 are configured to guide the smoking articles 40 from the orifice 312 to the smoking article transporting device 330 via gravity or an actuation mechanism. However, the "repository 310" is also any other type of rotating drum or other manufacturing component used to manufacture, transport, or otherwise manipulate the smoking article 40 prior to the smoking article being received at the smoking article transporting device 330. For example, the repository 310 is rotatable drum rotating about an axis parallel to the axis at which the smoking article transporting device 340 rotates. In another example, the repository 310 is a wrapping mechanism that wraps and secures the foil wrapper 48 about the filter rod and the fuel source to form the compartment 46 of the smoking article 40. Thus, the repository 310 being formed as a hopper in FIG. 8 is merely for exemplary purposes and should in no way limit the structure of the repository 310.

The smoking article transporting device 330 comprises in some aspects one or more drums 332 each rotatable about a rotational axis and having a circumferential outer edge 334 defining a plurality of grooves 336 each extending parallel to the rotational axis. Each of the plurality of grooves 336 is configured in some aspects to receive a single one of the smoking articles 40 therein. As illustrated in FIG. 8, for example, each of the plurality of grooves 336 is configured to receive the single one of the smoking articles 40 such that the smoking articles 40 are aligned parallel to the rotational axis of the drum 332.

The circumferential outer edge 334 of the one or more drums 332 is configured to be arranged adjacent to the incline 314 or the repository 310, itself, to receive a single one of the smoking articles 40 therein in each groove 336 via gravity or an actuation mechanism such as those described above. Accordingly, when one of the plurality of grooves 336 of the one or more drums 332 is aligned with an end of the incline 314 or the repository 310, a single one of the smoking articles 40 is able to roll from the edge of the incline 314 and into a single one of the plurality of grooves 336. According to some aspects, the plurality of grooves 336 are in fluid communication with a vacuum pressure arrangement (not shown) configured to apply a vacuum pressure to each of the plurality of grooves 336 of the one or more drums to retain the single one of the smoking articles 40 received therein. As such, when a groove 336 aligns with the edge of the incline 314, the suction force provided by the vacuum pressure arrangement is configured to urge the single smoking article 40 from the incline 314 and into a single one of the plurality of grooves 336. The vacuum pressure arrangement is then configured to retain the smoking articles 40 within a single one of the plurality of grooves 336 as the one or more drums 332 rotate about the axis thereof.

The x-ray imaging device 320 is disposed proximate to the circumferential outer edge 334 of the one or more drums 332. In this manner, the field of view of the x-ray imaging device 320 is determined by the disposition thereof, such that the field of view of the x-ray imaging device encompasses a portion of the circumferential outer edge 334 of the one or more drums 332. In some aspects, the x-ray imaging device 320 is disposed stationary relative to the rotation of the one or more drums 332. Accordingly, the imaging zone 322 defined by the field of view is also stationary, such that rotation of the one or more drums 332 results in sequentially introducing smoking articles 40 disposed in a single one of the grooves 336 into the imaging zone 322.

As previously disclosed, the one or more drums 332 are configured to sequentially introduce the smoking articles 40 to the imaging zone 322 at predetermined intervals. For example, the plurality of grooves 336 defined by the one or more drums 332 are arranged along the circumferential outer edge 334 at equal angular intervals. Accordingly, the rotational speed of the one or more drums 332 is able to define the interval between the introductions of the smoking articles 40 to the imaging zone 322. For example, if the rotational speed of the one or more drums 332 increases, the interval between the introductions of the smoking articles 40 decreases. Likewise, if the rotational speed of the one or more drums 332 decreases, the interval between when each of the smoking articles 40 is introduced to the imaging zone 322 will increase. Thus, the x-ray imaging device 320 is configured to capture the at least one image of at least the compartment 46 of each of the smoking articles 40 about a side view of the smoking article 40, as the smoking articles 40 are sequentially introduced into the imaging zone 322 by rotation of the one or more drums 332 about the rotational axis thereof.

In some aspects, the analysis unit 340 is then configured to receive the at least one image from the x-ray imaging device 320 and is configured to analyze the at least one image captured thereby for each of the smoking articles 40. The analysis unit 340 thus includes, in some aspects, an inspection tool 342 that is configured to determine a density the one or more of the capsule objects 10 disposed within the compartment 46 of the smoking article 40 based on the analysis of the at least one image of the compartment of the smoking article captured by the x-ray imaging device 320. In some aspects, the "smoking article integrity" is determined by a volume of the compartment 46 that is occupied by the one or more capsule objects 10. More particularly, the at least one image received from the x-ray imaging device 320 includes an image of the compartment 46 of the smoking article 40 where the one or more capsule objects 10 are disposed. Any quantity of the payload 14 within the outer shell 12 of the capsule object 10 appears in the image in contrast any air within the compartment 46, since the payload material is denser than air. The inspection tool 342 is able to ascertain based on the 2D dimensions from the image, measured via Cartesian coordinates, as well as predetermined spatial relationships stored within the analysis unit 340 (e.g., a volume of the compartment 46, dimensions of the compartment, etc.) a volume of the compartment 46 that is occupied by the one or more capsule objects 10.

The analysis unit 340 further includes, in some aspects, a comparison tool 344 that is configured to determine whether each of the smoking articles 40 is acceptable for further processing. In this manner, the comparison tool 344 is capable of receiving the smoking article integrity determined by the inspection tool 342 and using the determined smoking article integrity to compare it against an ideal smoking article integrity. The ideal smoking article integrity is, in some aspects, an ideal volume of the compartment occupied by the one or more capsule objects 10 disposed therein, which has been predetermined and stored in a data storage associated with the analysis unit 340. The ideal smoking article integrity is in these aspects based on a size, shape, material, application, etc., of the smoking articles 40. For example, the ideal smoking article integrity is about 1.2 g to about 1.4 g; and preferably about 1.3037 g. The comparison tool 344 is thus able to determine whether or not the smoking articles 40 are acceptable or not acceptable for further processing. For example, the smoking articles 40 acceptable for further processing each have a volume of the compartment 46 occupied by the one or more capsule objects 10 disposed therein at least equivalent to the ideal volume of the compartment 46 occupied by the one or more capsule objects 10 disposed therein. In another example, the smoking articles 40 not acceptable for further processing each have a volume of the compartment 46 occupied by the one or more capsule objects 10 disposed therein less than the ideal volume of the compartment 46 occupied by the one or more capsule objects 10 disposed therein.

In some aspects, the one or more drums 332 are configured to sort the smoking articles 40, so as to separate any of the smoking articles 40 acceptable for further processing from any of the smoking articles 40 not acceptable for further processing based on the status as determined by the comparison tool 344. To this end, the one or more drums 332 are able to divert the acceptable smoking articles 40 (e.g., as a result of having a volume of the compartment 46 occupied by the one or more capsule objects 10 disposed therein at least equivalent to the ideal volume of the compartment 46 occupied by the one or more capsule objects 10 disposed therein or other parameter meeting values based on the at least one image captured by the x-ray imaging device 320) to one path or storage location and the not acceptable smoking articles 40 (e.g., as a result of having a volume of the compartment 46 occupied by the one or more capsule objects 10 disposed therein less than the ideal volume of the compartment 46 occupied by the one or more capsule objects 10 disposed therein or other parameter not meeting values based on the least one image captured by the x-ray imaging device 220), to another path or storage location. In some aspects, the acceptable smoking articles 40 will be directed to a storage unit prior to transporting the accepted smoking articles 40 to a packaging apparatus. Alternatively, the acceptable smoking articles 40 are directly transported to the packaging apparatus.

Accordingly, the systems described herein advantageously differentiate between smoking-related articles having a determined integrity and ones that do not. Specifically, they are capable of determining if a capsule object comprises an air bubble, has broken, and the like, which a standard microwave-based inspection system is incapable of doing.

Figure 9:
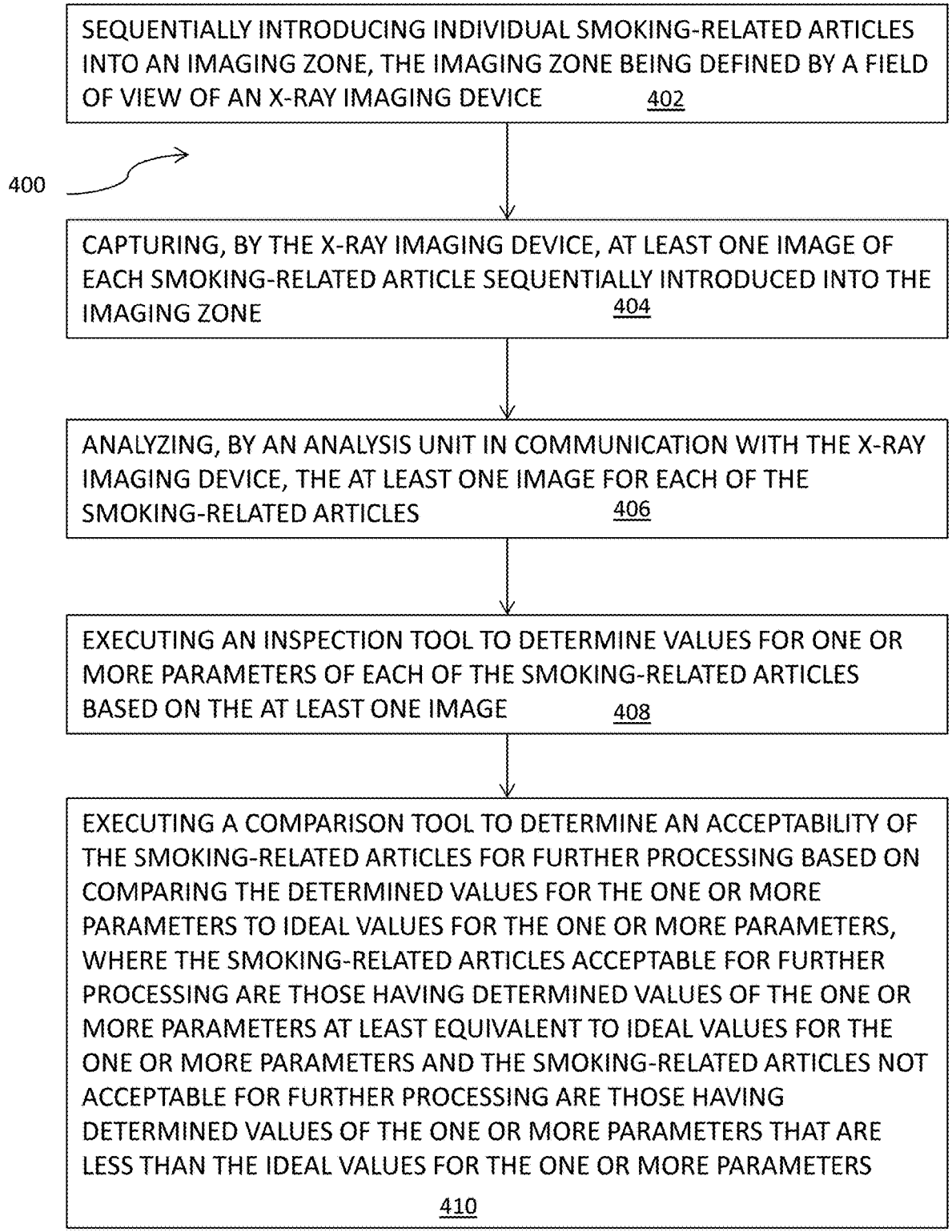
FIG. 9 illustrates a schematic block diagram of a method for inspecting smoking-related articles according to an example aspect of the present disclosure.

Some aspects of the following invention provide for a method 400 for inspecting smoking-related articles, as illustrated in FIG. 9. The method is configured to be performed using an inspection system such as those described herein in reference to FIGS. 5-8, although the method is suitable to be performed using other inspection systems as well. The method 400 includes, for example, sequentially introducing individual smoking-related articles into an imaging zone, the imaging zone being defined by a field of view of an x-ray imaging device as illustrated in Block 402. The method further includes capturing, by the x-ray imaging device, at least one image of each smoking-related article sequentially introduced into the imaging zone, as illustrated in Block 404. The method further includes analyzing, by an analysis unit in communication with the x-ray imaging device, the at least one image for each of the smoking-related articles in Block 406. Specifically, in Block 408, the analysis includes executing an inspection tool to determine values for one or more parameters of each of the smoking-related articles based on the at least one image. In Block 410, the analysis further includes executing a comparison tool to determine an acceptability of the smoking-related articles for further processing based on comparing the determined values for the one or more parameters to ideal values for the one or more parameters, where the smoking-related articles acceptable for further processing are those having determined values of the one or more parameters at least equivalent to the ideal values for the one or more parameters and the smoking-related articles not acceptable for further processing are those having determined values of the one or more parameters that are less than the ideal values for the one or more parameters.

In some aspects, in Block 402, sequentially introducing individual smoking-related articles into the imaging zone comprises sequentially introducing capsule objects into the imaging zone, each of the capsule objects including an outer shell and a payload disposed within the outer shell. In some aspects, in Block 408, executing the inspection tool to determine values for the one or more parameters of each of the smoking-related articles comprises determining a capsule object integrity of each of the capsule objects based on the analysis of the at least one image of the capsule object captured by the x-ray imaging device, the capsule object integrity of each of the capsule objects being determined by a volume of the outer shell occupied by the payload.

In some aspects, in Block 410, executing the comparison tool to determine the acceptability of the smoking-related articles for further processing comprises determining whether each of the capsule objects is acceptable for further processing based on comparing the determined capsule object integrity against an ideal capsule object integrity, the capsule objects acceptable for further processing having a determined volume of the outer shell occupied by the payload at least equivalent to an ideal volume of the outer shell occupied by the payload, and the capsule objects not acceptable for further processing having a determined volume of the outer shell occupied by the payload less than the ideal volume of the outer shell occupied by the payload. In some aspects, the method 400 comprises receiving a single one of the capsule objects in one of a plurality of cavities defined about a circumferential outer edge of a feed wheel rotating about an axis, the x-ray imaging device being disposed proximate to the circumferential outer edge of the feed wheel, and capturing, by the x-ray imaging device, the at least one image of each of the capsule objects as the capsule objects are sequentially introduced into the imaging zone by rotation of the feed wheel In some aspects, the method 400 comprises applying a vacuum pressure from a vacuum pressure arrangement to each of the plurality of cavities of the feed wheel to retain the capsule objects received therein.

In some aspects, the method 400 comprises emitting, by an air injector, pressurized air having a positive pressure greater than the vacuum pressure and applying the pressurized air to one of the plurality of cavities at a first location along the circumferential outer edge of the feed wheel to eject the capsule object from the one of the plurality of cavities, if the capsule object therein is determined to be acceptable for further processing, and applying the pressurized air to the one of the plurality of cavities at a second location along the circumferential outer edge of the feed wheel to eject the capsule object from the one of the plurality of cavities, if the capsule object therein is determined not to be acceptable for further processing.

In some aspects, in Block 402, sequentially introducing individual smoking-related articles into an imaging zone comprises sequentially introducing filter rods each including a filter material having one or more of the capsule objects disposed therein into the imaging zone, or comprising sequentially introducing smoking articles each including a portion of the filter rod having one or more of the capsule objects disposed therein into the imaging zone, the portion of the filter rod of each of the smoking articles being coaxially aligned and serially engaged with an axially extending fuel source.

In some aspects, in Block 408, executing the inspection tool to determine values for the one or more parameters of each of the smoking-related articles comprises determining a filter rod integrity of each of the filter rods or filter rod portions of each of the smoking articles based on the analysis the at least one image of the capsule objects within the filter rod or filter rod portion of the smoking articles captured by the x-ray imaging device, the filter rod integrity of each of the filter rods or filter rod portions of each of the smoking articles being determined by a volume of the outer shell that is occupied by the payload for each of the one or more capsule objects disposed in the filter material of the filter rod or filter rod portion of each of the smoking articles.

In some aspects, in Block 410, executing the comparison tool to determine the acceptability of the smoking-related articles for further processing comprises determining whether each of the filter rods or smoking articles is acceptable for further processing based on comparing the determined filter rod integrity against an ideal filter rod integrity, the filter rods or smoking articles acceptable for further processing having a determined volume of the outer shell that is occupied by the payload at least equivalent to an ideal volume of the outer shell occupied by the payload for each of the one or more capsule objects disposed in the filter material of the filter rod or filter rod portion of each of the smoking articles, and the filter rods or smoking articles not acceptable for further processing having a determined volume of the outer shell occupied by the payload less than the ideal volume of the outer shell occupied by the payload for at least one of the one or more capsule objects disposed in the filter material of the filter rod or filter rod portion of each of the smoking articles.

In some aspects, the method 400 comprises receiving a single one of the filter rods or smoking articles in one of a plurality of grooves defined about a peripheral surface of a filter rod transporting device, each of the plurality of grooves extending parallel to a rotational axis of the filter rod transporting device, the single one of the filter rods or smoking articles being received in one of the plurality of grooves such that a longitudinal axis of the single one of the filter rods or smoking articles is parallel to the rotational axis of the filter rod transporting device.

In some aspects, the method 400 comprises receiving, by a filter rod conveying device disposed proximate to the filter rod transporting device and extending parallel to the rotational axis thereof, the filter rods or smoking articles from the grooves of the filter rod transporting device, and transporting, by the filter rod conveying device, the filter rods or smoking articles parallel to the longitudinal axis thereof such that the filter rods or smoking articles are sequentially introduced along the longitudinal axis thereof into the imaging zone defined by the field of view of the x-ray imaging device.

In some aspects, the method 400 comprises capturing, by the x-ray imaging device disposed proximate to the filter rod conveying device, the at least one image of each of the axially extending filter rods or filter rod portions of each of the smoking articles as the filter rods or smoking articles are sequentially introduced along the longitudinal axes thereof into the imaging zone.

In some aspects, the method 400 comprises sorting, by the filter rod conveying device, the filter rods or smoking articles, so as to separate any of the filter rods or smoking articles acceptable for further processing from any of the filter rods or smoking articles not acceptable for further processing, following imaging thereof with the x-ray imaging device.

In some aspects, in Block 402, sequentially introducing smoking articles into the imaging zone comprises sequentially introducing smoking articles each including a filter rod coaxially aligned with and axially spaced apart from an axially extending fuel source so as to define a compartment therebetween, the compartment being circumscribed by a foil wrapper and having one or more of the capsule objects disposed therein.

In some aspects, in Block 408, executing the inspection tool to determine values for the one or more parameters of each of the smoking-related articles comprises determining a smoking article integrity of the one or more of the capsule objects disposed within the compartment of the smoking article based on the analysis of the at least one image of the compartment of the smoking article captured by the x-ray imaging device, the smoking article integrity being determined by a volume of the compartment occupied by the one or more capsule objects.

In some aspects, in Block 410, executing the comparison tool to determine the acceptability of the smoking-related articles for further processing comprises determining whether each of the smoking articles is acceptable for further processing based on comparing the determined smoking article integrity against an ideal smoking article integrity, the smoking articles acceptable for further processing having a determined volume of the compartment occupied by the one or more capsule objects at least equivalent to an ideal volume of the compartment occupied by the one or more capsule objects, and the smoking articles not acceptable for further processing having a determined volume of the compartment occupied by the one or more capsule objects less than the ideal volume of the compartment occupied by the one or more capsule objects.

In some aspects, the method 400 further comprises receiving a single one of the smoking articles in one of a plurality of grooves defined about a circumferential outer edge of one or more drums rotatable about a rotational axis, each of the plurality of grooves extending parallel to the rotational axis of the one or more drums, and capturing, by the x-ray imaging device disposed proximate to the circumferential outer edge of the one or more drums, the at least one image of at least the compartment of each of the smoking articles as the smoking articles are sequentially introduced into the imaging zone by rotation of the one or more drums about the rotational axis thereof.

In some aspects, the method 400 further comprises controlling, by a control device, actuation of the x-ray imaging device to image each of the smoking-related articles sequentially introduced into the imaging zone.

In some aspects, the method 400 further comprises synchronizing actuation of the x-ray imaging device with the smoking-related article transporting device such that the x-ray imaging device captures images of the smoking-related articles as each of the smoking-related articles is sequentially introduced into the imaging zone by the smoking-related article transporting device.

Referring now to FIG. 10, an apparatus 500 is provided that is suitable to be employed by devices and/or systems performing functions in accordance with example aspects of the present disclosure. The apparatus 500 is embodied, for example, as any device hosting, including, controlling, comprising, or otherwise forming a portion of the at least one x-ray imaging device, the smoking-related article transporting device, the analysis unit, the monitor(s), and/or any other part of the inspection system or the inspection system as a whole in reference. Notably, the "inspection system" in reference to FIG. 10 relates to any of the inspection systems described above in reference to FIGS. 5-8. However, the following will be described in reference to the inspection system 50 for exemplary purposes only and in no way limits the apparatus 500 to the inspection system 50 in any manner.

According to one aspect, the apparatus 500 is embodied in or as the analysis unit 90. However, aspects of the apparatus 500 are also embodied on a plurality of other devices such as, for example, where instances of the apparatus are embodied on the network 80. As such, one aspect of the apparatus 500 is illustrated in FIG. 10 by way of example and is capable of including more, or in some cases, less than the components shown in FIG. 10.

With further regard to FIG. 10, the apparatus 500 is configured to analyze the at least one image captured by the at least one x-ray imaging device 60 and/or other data captured by the inspection system 50. As depicted in FIG. 10, the apparatus 500 includes or otherwise is in communication with a processor 502, a memory device 504, a communication interface 506, a user interface 508, an inspection module 510, and/or a comparison module 512. The memory device 504 includes, in some aspects, a non-transitory and tangible memory that is, for example, volatile and/or non-volatile memory. The memory device 504 is configured to store information, data, files, applications, instructions or the like. For example, the memory device 504 could be configured to buffer input data for processing by the processor 502. Additionally or alternatively, the memory device 504 could be configured to store instructions for execution by the processor 502.

The apparatus 500 is, in some aspects, a user terminal, a fixed communication device, and/or a computing device, such as a server configured to employ an example aspect of the present disclosure. However, according to some aspects, the apparatus 500 is physically embodied as a chip or a chipset. The chip or chipset constitutes a means for performing one or more operations for providing the functionalities described herein.

The processor 502 is embodied in a number of different ways. For example, the processor 502 is embodied as one or more of various processing devices such as a coprocessor, a microprocessor, a controller, a digital signal processor (DSP), processing circuitry, or various other processing devices including integrated circuits such as, for example, a special-purpose computer chip, or other hardware processor. In an example aspect, the processor 502 is configured to execute instructions stored in the memory device 504 or otherwise accessible to the processor. Additionally or alternatively, the processor 502 is configured to execute hard coded functionality. As such, the processor 502 is capable of performing operations according to aspects of the present disclosure while configured accordingly. Alternatively, when the processor 502 is embodied as an executor of software instructions, the instructions specifically configure and/or cause the processor 502 to perform the operations described herein. The processor 502 includes a clock, an arithmetic logic unit (ALU), and/or logic gates that are configured to support operation of the processor 502, amongst other components.

The communication interface 506 is any device or circuitry embodied in either hardware, software, or a combination thereof that is configured to receive and/or transmit data. In this regard, the communication interface 506 includes, for example, an antenna and supporting hardware and/or hardwired components and/or software. Accordingly, the communication interface 506 provides for communication with external devices, such as the network 80, the at least one x-ray imaging device 60, and/or the monitor(s). In some embodiments, the communication interface 506 provides for communication with additional portions of the system 50, such as the smoking-related article transporting device 70. In some aspects, the communication interface 506 provides for transmitting and/or receiving data through, for example, the wired or wireless network 80, such as a local area network (LAN), a metropolitan area network (MAN), and/or a wide area network (WAN), for example, the Internet.

In some embodiments, the apparatus 500 further includes a user interface 508. The user interface 508 is in communication with the processor 502. For example, the user interface 508 receives an indication of a user input at the user interface 508 and/or provides an audible/visible, mechanical (e.g., haptic), and/or other output to the user. As such, the user interface 508 includes, for example, a keyboard, a mouse, a joystick, a monitor or display, a touch screen, a microphone, a speaker, and/or any other suitable input/output mechanisms for performing the operations described herein. The processor 502 is configured to control at least some functions of one or more elements of the user interface 508.

According to some aspects, the apparatus 500 further includes an inspection module 510. The processor 502 is configured to control at least some functions of one or more elements of the inspection module 510. The inspection module 510 is configured to execute an inspection tool to determine values for one or more parameters of each of the smoking-related articles based on the at least one image received from the x-ray imaging device 60.

In this regard, the inspection tool is configured to determine a capsule object integrity of each of the capsule objects 10 based on the analysis of the at least one image of the capsule object captured by the x-ray imaging device, the capsule object integrity of each of the capsule objects being determined by a volume of the outer shell occupied by the payload. In other aspects, the inspection tool is configured to determine a filter rod integrity of each of the filter rods or filter rod portions 20 based on the analysis of the capsule objects within the at least one image of the filter rod or filter rod portion captured by the x-ray imaging device, the filter rod integrity of each of the filter rods or filter rod portions being determined by a volume of the outer shell that is occupied by the payload for each of the one or more capsule objects disposed in the filter material of the filter rod or filter rod portion. In still further aspects, the inspection tool is configured to determine a smoking article integrity of the one or more of the capsule objects disposed within the compartment of the smoking article based on the analysis of the at least one image captured by the x-ray imaging device, the smoking article integrity being determined by a volume of the compartment occupied by the one or more capsule objects disposed therein.

As such, the apparatus 500 further includes a comparison module 512. The processor 502 is configured to control at least some functions of one or more elements of the comparison module 512. The comparison module 512 is configured to execute a comparison tool to determine an acceptability of the smoking-related articles for further processing based on comparing the determined values for the one or more parameters to ideal values for the one or more parameters, where the smoking-related articles acceptable for further processing are those having determined values of the one or more parameters at least equivalent to the ideal values for the one or more parameters and the smoking-related articles not acceptable for further processing are those having determined values of the one or more parameters that are less than the ideal values for the one or more parameters.

In this regard, the comparison tool is configured to determine whether each of the capsule objects is acceptable for further processing based on comparing the determined capsule object integrity against an ideal capsule object integrity, the capsule objects acceptable for further processing having a determined volume of the outer shell occupied by the payload at least equivalent to an ideal volume of the outer shell occupied by the payload, and the capsule objects not acceptable for further processing having a determined volume of the outer shell occupied by the payload less than the ideal volume of the outer shell occupied by the payload.

In another aspect, the comparison tool is configured to determine whether each of the filter rods or smoking articles is acceptable for further processing based on comparing the determined filter rod integrity against an ideal filter rod integrity, the filter rods or smoking articles acceptable for further processing having a determined volume of the outer shell that is occupied by the payload at least equivalent to an ideal volume of the outer shell occupied by the payload for each of the one or more capsule objects disposed in the filter material of the filter rod or filter rod portion of each of the smoking articles, and the filter rods or smoking articles not acceptable for further processing having a determined volume of the outer shell occupied by the payload less than the ideal volume of the outer shell occupied by the payload for at least one of the one or more capsule objects disposed in the filter material of the filter rod or filter rod portion of each of the smoking articles.

In a still further aspect, the comparison tool is configured to determine whether each of the smoking articles is acceptable for further processing based on comparing the determined smoking article integrity against an ideal smoking article integrity, the smoking articles acceptable for further processing having a determined volume of the compartment occupied the one or more capsule objects at least equivalent to an ideal volume of the compartment occupied by the one or more capsule objects, and the smoking articles not acceptable for further processing having a determined volume of the compartment occupied by the one or more capsule objects less than the ideal volume of the compartment occupied by the one or more capsule objects.

The various features of the described aspects of the present disclosure are capable of being used separately or in any combination. Various aspects described herein are able to be implemented by software, hardware or a combination of hardware and software. The described aspects also are able to be implemented as computer-readable program code portions on a computer readable storage medium for controlling and/or performing the above-described operations. In this regard, a computer readable storage medium, as used herein, refers to a non-transitory, physical storage medium (e.g., a volatile or non-volatile memory device), which can be read by a computer system. Examples of computer readable storage medium include read-only memory, random-access memory, CD-ROMs, DVDs, magnetic tape, optical data storage devices and/or the like. The computer readable storage medium also is able to be distributed over network-coupled computer systems so that the computer-readable program code portions are stored and executed in a distributed fashion.

As previously disclosed, the processor 502 is configured to execute computer-readable program code portions for performing the above-described operations. In this regard, an aspect of a non-transitory computer readable storage medium that has computer-readable program code portions stored therein that, in response to execution by a processor (e.g., processor 502), causes an inspection system to sequentially introduce smoking-related articles (e.g., capsule objects including an outer shell and a payload disposed within the outer shell, filter rods each including a filter material having one or more of the capsule objects disposed therein, smoking articles each including a portion of the filter rod having the one or more of the capsule objects disposed therein, smoking articles each including a filter rod coaxially aligned with and axially spaced apart from an axially extending fuel source so as to define a compartment therebetween, the compartment being circumscribed by a foil wrapper and having one or more of the capsule objects disposed therein, and the like) into an imaging zone.

The non-transitory computer readable storage medium includes computer-readable program code instructions that, when executed by a processor, cause a system to receive at least one image of one of a series of smoking-related articles. In particular, the non-transitory computer readable storage medium may include computer-readable program code instructions that, when executed by a processor, cause an x-ray imaging device to capture at least one image of each smoking-related article sequentially introduced into the imaging zone, which is defined by a field of view of the x-ray imaging device. Additionally, in some embodiments, the non-transitory computer readable storage medium include computer-readable program code instructions that cause the x-ray imaging device to transmit data corresponding to the captured image of the capsule object to an analysis unit.

Many modifications and other aspects of the disclosure set forth herein will come to mind to one skilled in the art to which the disclosure pertains having the benefit of the teachings presented in the foregoing description and the associated drawings. Therefore, it is to be understood that the disclosure is not to be limited to the specific aspects disclosed and that modifications and other aspects are intended to be included within the scope of the appended claims. Moreover, although the foregoing description and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An inspection system configured to inspect smoking-related articles, comprising:
    an x-ray imaging device comprising an emitter tube and a detector configured to capture at least one image of the smoking-related articles sequentially introduced into an imaging zone, the imaging zone being defined by a field of view of the emitter tube, the smoking-related articles comprising filter rods each including a filter material having one or more capsule objects, the capsule objects including an outer shell and a payload disposed within the outer shell, disposed therein, or the smoking-related articles comprise smoking articles each including a portion of the filter rod having the one or more of the capsule objects disposed therein, the portion of the filter rod being coaxially aligned and serially engaged with an axially extending fuel source;
    a smoking-related article transporting device configured to sequentially introduce the smoking-related articles into the imaging zone; and
    an x-ray data analysis unit comprising a hardware processor and memory, the x-ray data analysis unit being in communication with the detector of the x-ray imaging device and configured to analyze the at least one image captured by the detector for each of the smoking-related articles, the x-ray data analysis unit being configured to execute:
        an x-ray data inspection tool comprising an inspection module configured to determine values for one or more parameters of each of the smoking-related articles based on the analysis of the at least one image; and
        an x-ray data comparison tool comprising a comparison module configured to determine an acceptability of the smoking-related articles for further processing based on comparing the determined values for the one or more parameters to ideal values for the one or more parameters, wherein the smoking-related articles acceptable for further processing have determined values of the one or more parameters at least equivalent to the ideal values for the one or more parameters and the smoking-related articles not acceptable for further processing have determined values of the one or more parameters less than the ideal values for the one or more parameters.

2. The inspection system according to claim 1, wherein the inspection tool is configured to determine a capsule object integrity of each of the capsule objects based on the analysis of the at least one image of the capsule object captured by the x-ray imaging device, and wherein the capsule object integrity of each of the capsule objects is determined by a volume of the outer shell occupied by the payload.

3. The inspection system according to claim 2, wherein the comparison tool is configured to determine whether each of the capsule objects is acceptable for further processing based on comparing the determined capsule object integrity against an ideal capsule object integrity, wherein the capsule objects acceptable for further processing have a determined volume of the outer shell occupied by the payload at least equivalent to an ideal volume of the outer shell occupied by the payload, and the capsule objects not acceptable for further processing have a determined volume of the outer shell occupied by the payload less than the ideal volume of the outer shell occupied by the payload.

4. The inspection system according to claim 1, wherein the inspection tool is configured to determine a filter rod integrity of each of the filter rods or filter rod portions of each of the smoking articles based on the analysis of the at least one image of the capsule objects within the filter rod or filter rod portion of the smoking articles captured by the x-ray imaging device, and wherein the filter rod integrity of each of the filter rods or filter rod portions of each of the smoking articles is determined by a volume of the outer shell that is occupied by the payload for each of the one or more capsule objects disposed in the filter material of the filter rod or filter rod portion of each of the smoking articles.

5. The inspection system according to claim 4, wherein the comparison tool is configured to determine whether each of the filter rods or smoking articles is acceptable for further processing based on comparing the determined filter rod integrity to an ideal filter rod integrity, wherein the filter rods or smoking articles acceptable for further processing have a determined the volume of the outer shell that is occupied by the payload at least equivalent to an ideal volume of the outer shell occupied by the payload for each of the one or more capsule objects disposed in the filter material of the filter rod or filter rod portion of each of the smoking articles, and the filter rods or smoking articles not acceptable for further processing have a determined volume of the outer shell occupied by the payload less than the ideal volume of the outer shell occupied by the payload for at least one of the one or more capsule objects disposed in the filter material of the filter rod or filter rod portion of each of the smoking articles.

6. The inspection system according to claim 5, wherein the smoking-related article transporting device comprises a filter rod transporting device having a peripheral surface defining a plurality of grooves each extending parallel to a rotational axis of the filter rod transporting device, each of the plurality of grooves being configured to receive a single one of the filter rods or smoking articles therein such that a longitudinal axis of the single one of the filter rods or smoking articles is parallel to the rotational axis of the filter rod transporting device.

7. The inspection system according to claim 6, wherein the smoking-related article transporting device further comprises a filter rod conveying device disposed proximate to the filter rod transporting device and extending parallel to the rotational axis thereof, the filter rod conveying device being configured to sequentially receive the filter rods or smoking articles from the grooves of the filter rod transporting device, and to transport the filter rods or smoking articles parallel to the longitudinal axis thereof such that the filter rods or smoking articles are sequentially introduced along the longitudinal axes thereof into the imaging zone defined by the field of view of the x-ray imaging device.

8. The inspection system according to claim 7, wherein the x-ray imaging device is disposed proximate to the filter rod conveying device and is configured to capture the at least one image of each of the axially extending filter rods or filter rod portions of each of the smoking articles as the filter rods or smoking articles are sequentially introduced along the longitudinal axes thereof into the imaging zone.

9. The inspection system according to claim 8, wherein the filter rod conveying device is configured to sort the filter rods or smoking articles, so as to separate any of the filter rods or smoking articles acceptable for further processing from any of the filter rods or smoking articles not acceptable for further processing, following imaging thereof with the x-ray imaging device.

10. The inspection system according to claim 1, further comprising an x-ray imaging control device connected to and in communication with the x-ray imaging device and arranged to control actuation of the x-ray imaging device to image each of the smoking-related articles sequentially introduced into the imaging zone.

11. The inspection system according to claim 10, wherein the control device is configured to synchronize actuation of the x-ray imaging device with the smoking-related article transporting device such that the x-ray imaging device captures images of the smoking-related articles as each of the smoking-related articles is sequentially introduced into the imaging zone by the smoking-related article transporting device.

12. A method for inspecting smoking-related articles, the method comprising:
sequentially introducing individual smoking-related articles into an imaging zone, the imaging zone being defined by a field of view of an emitter of an x-ray imaging device, the smoking-related articles comprising filter rods each including a filter material having one or more capsule objects, the capsule objects including an outer shell and a payload disposed within the outer shell, disposed therein, or the smoking-related articles comprise smoking articles each including a portion of the filter rod having the one or more of the capsule objects disposed therein, the portion of the filter rod being coaxially aligned and serially engaged with an axially extending fuel source;
capturing, by a detector of the x-ray imaging device, at least one image of each smoking-related article sequentially introduced into the imaging zone; and
analyzing, by an x-ray data analysis unit comprising a hardware processor and memory, the x-ray data analysis unit being in communication with the detector of the x-ray imaging device, the at least one image for each of the smoking-related articles, the analysis including:
executing an inspection tool comprising an inspection module to determine values for one or more parameters of each of the smoking-related articles based on the at least one image; and
executing a comparison tool comprising a comparison module to determine an acceptability of the smoking-related articles for further processing based on comparing the determined values for the one or more parameters to ideal values for the one or more parameters, where the smoking-related articles acceptable for further processing are those having determined values of the one or more parameters at least equivalent to the ideal values for the one or more parameters and the smoking-related articles not acceptable for further processing are those having determined values of the one or more parameters that are less than the ideal values for the one or more parameters.

13. The method according to claim 12, wherein executing the inspection tool to determine values for the one or more parameters of each of the smoking-related articles comprises determining a capsule object integrity of each of the capsule objects based on the analysis of the at least one image of the capsule object captured by the x-ray imaging device, the capsule object integrity of each of the capsule objects being determined by a volume of the outer shell occupied by the payload.

14. The method according to claim 13, wherein executing the comparison tool to determine the acceptability of the smoking-related articles for further processing comprises determining whether each of the capsule objects is acceptable for further processing based on comparing the determined capsule object integrity against an ideal capsule object integrity, the capsule objects acceptable for further processing having a determined volume of the outer shell occupied by the payload at least equivalent to an ideal volume of the outer shell occupied by the payload, and the capsule objects not acceptable for further processing having a determined volume of the outer shell occupied by the payload less than the ideal volume of the outer shell occupied by the payload.

15. The method according to claim 12, wherein executing the inspection tool to determine values for the one or more parameters of each of the smoking-related articles comprises determining a filter rod integrity of each of the filter rods or filter rod portions of each of the smoking articles based on the analysis the at least one image of the capsule objects within the filter rod or filter rod portion of the smoking articles captured by the x-ray imaging device, the filter rod integrity of each of the filter rods or filter rod portions of each of the smoking articles being determined by a volume of the outer shell that is occupied by the payload for each of the one or more capsule objects disposed in the filter material of the filter rod or filter rod portion of each of the smoking articles.

16. The method according to claim 15, wherein executing the comparison tool to determine the acceptability of the smoking-related articles for further processing comprises determining whether each of the filter rods or smoking articles is acceptable for further processing based on comparing the determined filter rod integrity against an ideal filter rod integrity, the filter rods or smoking articles acceptable for further processing having a determined volume of the outer shell that is occupied by the payload at least equivalent to an ideal volume of the outer shell occupied by the payload for each of the one or more capsule objects disposed in the filter material of the filter rod or filter rod portion of each of the smoking articles, and the filter rods or smoking articles not acceptable for further processing having a determined volume of the outer shell occupied by the payload less than the ideal volume of the outer shell occupied by the payload for at least one of the one or more capsule objects disposed in the filter material of the filter rod or filter rod portion of each of the smoking articles.

17. The method according to claim 16, comprising receiving a single one of the filter rods or smoking articles in one of a plurality of grooves defined about a peripheral surface of a filter rod transporting device, each of the plurality of grooves extending parallel to a rotational axis of the filter rod transporting device, the single one of the filter rods or smoking articles being received in one of the plurality of grooves such that a longitudinal axis of the single one of the filter rods or smoking articles is parallel to the rotational axis of the filter rod transporting device.

18. The method according to claim 17, comprising receiving, by a filter rod conveying device disposed proximate to the filter rod transporting device and extending parallel to the rotational axis thereof, the filter rods or smoking articles from the grooves of the filter rod transporting device, and transporting, by the filter rod conveying device, the filter rods or smoking articles parallel to the longitudinal axis thereof such that the filter rods or smoking articles are sequentially introduced along the longitudinal axes thereof into the imaging zone defined by the field of view of the x-ray imaging device.

19. The method according to claim 18, comprising capturing, by the x-ray imaging device disposed proximate to the filter rod conveying device, the at least one image of each of the axially extending filter rods or filter rod portions of each of the smoking articles as the filter rods or smoking articles are sequentially introduced along the longitudinal axes thereof into the imaging zone.

20. The method according to claim 19, comprising sorting, by the filter rod conveying device, the filter rods or smoking articles, so as to separate any of the filter rods or smoking articles acceptable for further processing from any of the filter rods or smoking articles not acceptable for further processing, following imaging thereof with the x-ray imaging device.

21. The method according to claim 12, comprising controlling, by a control device, actuation of the x-ray imaging device to image each of the smoking-related articles sequentially introduced into the imaging zone.

22. The method according to claim 21, comprising synchronizing actuation of the x-ray imaging device with the smoking-related article transporting device such that the x-ray imaging device captures images of the smoking-related articles as each of the smoking-related articles is sequentially introduced into the imaging zone by the smoking-related article transporting device.

23. A computer-readable storage medium that is non-transitory and has computer-readable program code portions stored therein that, in response to execution by a processor, cause a system to at least:
sequentially introduce individual smoking-related articles into an imaging zone, the imaging zone being defined by a field of view of an emitter of an x-ray imaging device, the smoking-related articles comprising filter rods each including a filter material having one or more capsule objects, the capsule objects including an outer shell and a payload disposed within the outer shell, disposed therein, or the smoking-related articles comprise smoking articles each including a portion of the filter rod having the one or more of the capsule objects disposed therein, the portion of the filter rod being coaxially aligned and serially engaged with an axially extending fuel source;
capture, by a detector of the x-ray imaging device, at least one image of each smoking-related article sequentially introduced into the imaging zone; and
analyze, by an x-ray data analysis unit comprising a hardware processor and memory, the x-ray data analysis unit being in communication with the detector of the x-ray imaging device, the at least one image for each of the smoking-related articles, the analysis including:
executing an inspection tool comprising an inspection module to determine values for one or more parameters of each of the smoking-related articles based on the at least one image; and
executing a comparison tool comprising a comparison module to determine an acceptability of the smoking-related articles for further processing based on comparing the determined values for the one or more parameters to ideal values for the one or more parameters, where the smoking-related articles acceptable for further processing are those having determined values of the one or more parameters at least equivalent to the ideal values for the one or more parameters and the smoking-related articles not acceptable for further processing are those having determined values of the one or more parameters that are less than the ideal values for the one or more parameters.

24. The computer-readable storage medium according to claim 23, wherein the computer-readable program code portions that cause the system to execute the inspection tool to determine values for the one or more parameters of each of the smoking-related articles are configured to cause the system to determine a capsule object integrity of each of the capsule objects based on the analysis of the at least one image of the capsule object captured by the x-ray imaging device, the capsule object integrity of each of the capsule objects being determined by a volume of the outer shell occupied by the payload.

25. The computer-readable storage medium according to claim 24, wherein the computer-readable program code portions that cause the system to execute the comparison tool to determine the acceptability of the smoking-related articles for further processing is configured to cause the system to execute the comparison tool to determine whether each of the capsule objects is acceptable for further processing based on comparing the determined capsule object integrity against an ideal capsule object integrity, the capsule objects acceptable for further processing having a determined volume of the outer shell occupied by the payload at least equivalent to an ideal volume of the outer shell occupied by the payload, and the capsule objects not acceptable for further processing having a determined volume of the outer shell occupied by the payload less than the ideal volume of the outer shell occupied by the payload.

26. The computer-readable storage medium according to claim 23, wherein the computer-readable program code portions that cause the system to execute the inspection tool to determine values for the one or more parameters of each of the smoking-related articles are configured to cause the system to determine a filter rod integrity of each of the filter rods or filter rod portions of each of the smoking articles based on the analysis the at least one image of the capsule objects within the filter rod or filter rod portion of the smoking articles captured by the x-ray imaging device, the filter rod integrity of each of the filter rods or filter rod portions of each of the smoking articles being determined by a volume of the outer shell that is occupied by the payload for each of the one or more capsule objects disposed in the filter material of the filter rod or filter rod portion of each of the smoking articles.

27. The computer-readable storage medium according to claim 26, wherein the computer-readable program code portions that cause the system to execute the comparison tool to determine the acceptability of the smoking-related articles for further processing is configured to cause the system to execute the comparison tool to determine whether each of the filter rods or smoking articles is acceptable for further processing based on comparing the determined filter rod integrity against an ideal filter rod integrity, the filter rods or smoking articles acceptable for further processing having a determined volume of the outer shell that is occupied by the payload at least equivalent to an ideal volume of the outer shell occupied by the payload for each of the one or more capsule objects disposed in the filter material of the filter rod or filter rod portion of each of the smoking articles, and the filter rods or smoking articles not acceptable for further processing having a determined volume of the outer shell occupied by the payload less than the ideal volume of the outer shell occupied by the payload for at least one of the one or more capsule objects disposed in the filter material of the filter rod or filter rod portion of each of the smoking articles.

28. The computer-readable storage medium according to claim 27, wherein the computer-readable program code portions further cause the system to receive a single one of the filter rods or smoking articles in one of a plurality of grooves defined about a peripheral surface of a filter rod transporting device, each of the plurality of grooves extending parallel to a rotational axis of the filter rod transporting device, the single one of the filter rods or smoking articles being received in one of the plurality of grooves such that a longitudinal axis of the single one of the filter rods or smoking articles is parallel to the rotational axis of the filter rod transporting device.

29. The computer-readable storage medium according to claim 28, wherein the computer-readable program code portions further cause the system to receive, by a filter rod conveying device disposed proximate to the filter rod transporting device and extending parallel to the rotational axis thereof, the filter rods or smoking articles from the grooves of the filter rod transporting device, and further cause the system to transport, by the filter rod conveying device, the filter rods or smoking articles parallel to the longitudinal axis thereof such that the filter rods or smoking articles are sequentially introduced along the longitudinal axes thereof into the imaging zone defined by the field of view of the x-ray imaging device.

30. The computer-readable storage medium according to claim 29, wherein the computer-readable program code portions further cause the system to capture, by the x-ray imaging device disposed proximate to the filter rod conveying device, the at least one image of each of the axially extending filter rods or filter rod portions of each of the smoking articles as the filter rods or smoking articles are sequentially introduced along the longitudinal axes thereof into the imaging zone.

31. The computer-readable storage medium according to claim 30, wherein the computer-readable program code portions further cause the system to sort, by the filter rod conveying device, the filter rods or smoking articles, so as to separate any of the filter rods or smoking articles acceptable for further processing from any of the filter rods or smoking articles not acceptable for further processing, following imaging thereof with the x-ray imaging device.

32. The computer-readable storage medium according to claim 23, wherein the computer-readable program code portions further cause the system to control, by a control device, actuation of the x-ray imaging device to image each of the smoking-related articles sequentially introduced into the imaging zone.

33. The computer-readable storage medium according to claim 32, wherein the computer-readable program code portions further cause the system to synchronize actuation of the x-ray imaging device with the smoking-related article transporting device such that the x-ray imaging device captures images of the smoking-related articles as each of the smoking-related articles is sequentially introduced into the imaging zone by the smoking-related article transporting device.

* * * * *